United States Patent
White et al.

(10) Patent No.: US 11,655,327 B2
(45) Date of Patent: May 23, 2023

(54) POLYMERIC MATERIAL INCLUDING A URETDIONE-CONTAINING MATERIAL AND AN EPOXY COMPONENT, TWO-PART COMPOSITIONS, AND METHODS

(71) Applicant: 3M INNOVATIVE PROPERTIES COMPANY, St. Paul, MN (US)

(72) Inventors: Kolby L. White, Woodbury, MN (US); Joseph D. Rule, Woodbury, MN (US); Michael A. Kropp, Cottage Grove, MN (US); Matthew J. Kryger, Hudson, WI (US); Zachary J. Thompson, Woodbury, MN (US); Richard B. Ross, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 17/265,023

(22) PCT Filed: Sep. 16, 2019

(86) PCT No.: PCT/US2019/051222
§ 371 (c)(1),
(2) Date: Feb. 1, 2021

(87) PCT Pub. No.: WO2020/060893
PCT Pub. Date: Mar. 26, 2020

(65) Prior Publication Data
US 2021/0317254 A1  Oct. 14, 2021

Related U.S. Application Data

(60) Provisional application No. 62/733,930, filed on Sep. 20, 2018.

(51) Int. Cl.
*C08G 18/28* (2006.01)
*B32B 7/12* (2006.01)
(Continued)

(52) U.S. Cl.
CPC ............ *C08G 18/2825* (2013.01); *B32B 7/12* (2013.01); *B32B 37/12* (2013.01); *C08G 18/003* (2013.01);
(Continued)

(58) Field of Classification Search
CPC .............. C08G 18/2825; C08G 18/003; C08G 18/2063; C08G 18/3228; C08G 18/3234;
(Continued)

(56) References Cited

U.S. PATENT DOCUMENTS 3,496,250 A    2/1970  Czerwinski
4,044,171 A    8/1977  Muller
(Continued)

FOREIGN PATENT DOCUMENTS

CN    101410428    4/2009
CN    101711262    5/2010
(Continued)

OTHER PUBLICATIONS

Carothers, "Polymers and Polyfunctionality", Transactions of the Faraday Society, 1936, vol. 32, pp. 39-49.
(Continued)

*Primary Examiner* — Cynthia L Schaller
(74) *Attorney, Agent, or Firm* — Adrian L. Pishko

(57) ABSTRACT

The present disclosure provides a polymeric material including a polymerized reaction product of a polymerizable composition including components and has a solids content of 90% or greater. The components include a uretdione-containing material including a reaction product of a diisocyanate reacted with itself; a first hydroxyl-containing compound; an optional second hydroxyl-containing compound having a single OH group, wherein; and an epoxy component. The first hydroxyl-containing compound has more than one OH group and the optional second hydroxyl-containing (Continued)

compound is a primary alcohol or a secondary alcohol. The present disclosure also provides a two-part composition, in which the polymeric material is included in the first part and the second part includes at least one amine. Further, a method of adhering two substrates is provided, including obtaining a two-part composition; combining at least a portion of the first part with at least a portion of the second part to form a mixture; disposing at least a portion of the mixture on a first substrate; and contacting a second substrate with the mixture disposed on the first substrate. The disclosure also provides a polymeric material and a method of making a two-part composition. Advantageously, two-part compositions according to the present disclosure can be used as coatings and adhesive systems with handling and performance similar to existing two-part urethane systems, but with less sensitivity to water.

20 Claims, 2 Drawing Sheets

(51) Int. Cl.

| | | |
|---|---|---|
| B32B 37/12 | (2006.01) | |
| C08G 18/00 | (2006.01) | |
| C08G 18/20 | (2006.01) | |
| C08G 18/32 | (2006.01) | |
| C08G 18/42 | (2006.01) | |
| C08G 18/48 | (2006.01) | |
| C08G 18/50 | (2006.01) | |
| C08G 18/79 | (2006.01) | |
| C08G 18/80 | (2006.01) | |
| C09D 175/08 | (2006.01) | |
| C09J 175/08 | (2006.01) | |
| C08G 18/22 | (2006.01) | |

(52) U.S. Cl.
CPC ....... *C08G 18/2063* (2013.01); *C08G 18/227* (2013.01); *C08G 18/325* (2013.01); *C08G 18/3228* (2013.01); *C08G 18/3234* (2013.01); *C08G 18/4238* (2013.01); *C08G 18/4808* (2013.01); *C08G 18/4854* (2013.01); *C08G 18/5024* (2013.01); *C08G 18/798* (2013.01); *C08G 18/8016* (2013.01); *C08G 18/8064* (2013.01); *C09D 175/08* (2013.01); *C09J 175/08* (2013.01); *B32B 2037/1269* (2013.01); *C08G 2170/90* (2013.01)

(58) Field of Classification Search
CPC .............. C08G 18/325; C08G 18/4238; C08G 18/4808; C08G 18/4854; C08G 18/5024; C08G 18/798; C08G 18/8016; C08G 18/8064; B32B 7/12; B32B 37/12; B32B 2037/1269; B32B 2307/7246; C09D 175/08; C09J 175/08; C09J 163/00
See application file for complete search history.

(56) References Cited

U.S. PATENT DOCUMENTS

| | | | |
|---|---|---|---|
| 4,463,154 A | 7/1984 | Disteldorf | |
| 4,483,789 A | 11/1984 | Kunze | |
| 4,786,655 A | 11/1988 | Grogler | |
| 5,354,834 A | 10/1994 | Yoshida | |
| 5,492,955 A | 2/1996 | Wamprecht | |
| 5,596,066 A | 1/1997 | Laas | |
| 5,719,240 A | 2/1998 | Gras | |
| 5,795,950 A | 8/1998 | Sugimoto | |
| 5,814,689 A | 9/1998 | Goldstein | |
| 5,861,193 A | 1/1999 | Goldstein | |
| 5,874,173 A | 2/1999 | Wenning | |
| 5,916,629 A | 6/1999 | Wenning | |
| 7,300,997 B2 | 11/2007 | Wenning | |
| 8,293,836 B2 | 10/2012 | Cranfill | |
| 8,829,146 B2 | 9/2014 | Spyrou | |
| 8,841,369 B2 | 9/2014 | Meyer | |
| 9,062,153 B2 | 6/2015 | Laufer | |
| 9,080,074 B2 | 7/2015 | Shaffer | |
| 9,102,785 B2 | 8/2015 | Martz | |
| 9,175,117 B2 | 11/2015 | Williams | |
| 9,657,206 B2 | 5/2017 | Greszta-Franz | |
| 9,718,995 B2 | 8/2017 | Kondos | |
| 2005/0090636 A1 | 4/2005 | Wenning | |
| 2005/0112968 A1 | 5/2005 | Panse | |
| 2005/0113552 A1 | 5/2005 | Tazzia | |
| 2005/0239992 A1 | 10/2005 | Spyrou | |
| 2006/0276675 A1 | 12/2006 | Haubennestel | |
| 2007/0225451 A1 | 9/2007 | Haubennestel | |
| 2007/0266897 A1 | 11/2007 | Spyrou | |
| 2007/0282089 A1 | 12/2007 | Spyrou | |
| 2008/0171816 A1* | 7/2008 | Spyrou | C08G 18/227 524/95 |
| 2008/0265201 A1 | 10/2008 | Spyrou | |
| 2009/0258962 A1 | 10/2009 | Martz | |
| 2010/0151138 A1 | 6/2010 | Occhiello | |
| 2010/0152404 A1 | 6/2010 | Flosbach | |
| 2010/0285311 A1 | 11/2010 | Steidl | |
| 2011/0067813 A1 | 3/2011 | Kramer | |
| 2012/0070569 A1 | 3/2012 | Hsieh | |
| 2012/0252926 A1 | 10/2012 | Meyer | |
| 2015/0175859 A1 | 6/2015 | Greszta-Franz | |
| 2015/0329751 A1 | 11/2015 | Stache | |
| 2016/0017179 A1 | 1/2016 | Spyrou | |
| 2016/0023384 A1 | 1/2016 | Spyrou | |
| 2016/0200857 A1 | 7/2016 | Williams | |
| 2016/0280976 A1* | 9/2016 | Buser | C08G 18/10 |
| 2017/0066179 A1 | 3/2017 | Diehl | |
| 2019/0316013 A1* | 10/2019 | Tang | C08G 18/4288 |

FOREIGN PATENT DOCUMENTS

| | | |
|---|---|---|
| CN | 106494064 | 3/2017 |
| EP | 0191915 | 8/1986 |
| EP | 1063269 | 12/2000 |
| WO | WO 1997-023536 | 7/1997 |
| WO | WO 2005-097858 | 10/2005 |
| WO | WO 2006-069839 | 7/2006 |
| WO | WO 2008-028769 | 3/2008 |
| WO | WO 2012-130711 | 10/2012 |
| WO | WO 2015-189164 | 12/2015 |
| WO | WO 2015-189169 | 12/2015 |
| WO | WO 2017-042175 | 3/2017 |
| WO | WO 2017-042177 | 3/2017 |
| WO | WO 2019-048956 | 3/2019 |
| WO | WO 2019-175709 | 9/2019 |
| WO | WO 2019-175714 | 9/2019 |
| WO | WO 2020-065438 | 4/2020 |
| WO | WO 2020-065456 | 4/2020 |
| WO | WO 2020-065466 | 4/2020 |
| WO | WO 2020-121116 | 6/2020 |
| WO | WO 2020-121124 | 6/2020 |

OTHER PUBLICATIONS

Chandalia, "New Non-Isocyanate Curatives for 2k Solvent-Borne Urethane Coatings", Proceedings of the Twenty-Eighth International Waterborne, High-Solids, and Powder Coatings Symposium, The University of Southern Mississippi, Feb. 2001, pp. 77-89.

Moriguchi, "Simple Method of Calculating Octanol/Water Partition Coefficient", Chemical and Pharmaceutical Bulletin, Jan. 1992, vol. 40, No. 1, pp. 127-130.

International Search Report for PCT International Application No. PCT/IB2019/051222, dated Dec. 24, 2019, 3 pages.

* cited by examiner

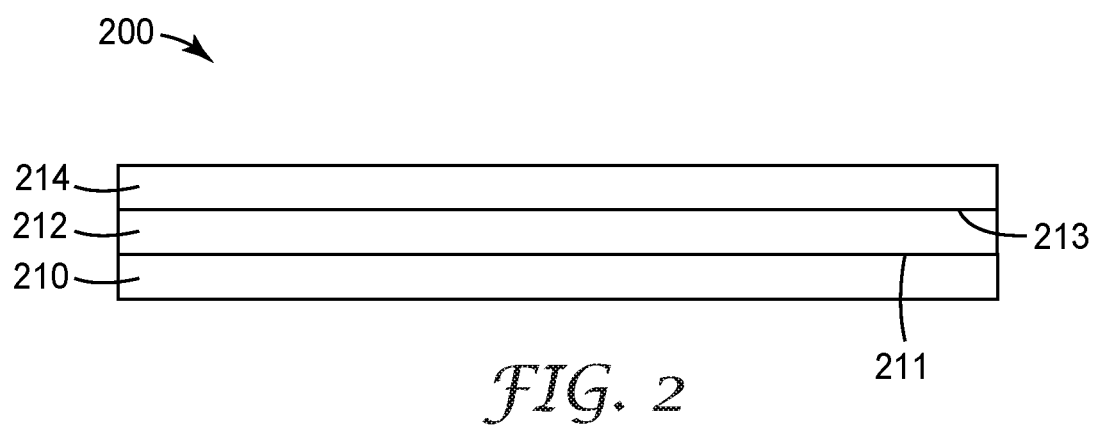

POLYMERIC MATERIAL INCLUDING A URETDIONE-CONTAINING MATERIAL AND AN EPOXY COMPONENT, TWO-PART COMPOSITIONS, AND METHODS

CROSS REFERENCE TO RELATED APPLICATIONS

This application is a national stage filing under 35 U.S.C. 371 of PCT/US2019/051222, filed Sep. 16, 2019, which claims the benefit of U.S. Application No. 62/733,930, filed Sep. 20, 2018, the disclosure of which is incorporated by reference in their entirety herein.

TECHNICAL FIELD

The present disclosure relates to polymeric materials that include uretdione-containing materials and epoxy components, such as two-part compositions.

BACKGROUND

Two-part urethane adhesives and sealants are commercially available from a variety of companies. These systems typically involve one component that is an oligomer/polymer terminated with isocyanate groups and a second component that is a polyol. When mixed, the isocyanate reacts with polyol to form carbamate groups. While this is established and effective chemistry, it suffers from a sensitivity to moisture due to ability of the isocyanate to be deactivated when reacted with water. Hence, there remains a need for adhesives and sealants that advantageously have less sensitivity to water.

SUMMARY

In a first aspect, a polymeric material is provided. The polymeric material includes a polymerized reaction product of a polymerizable composition including components and has a solids content of 90% or greater. The components include (a) a uretdione-containing material including a reaction product of a diisocyanate reacted with itself; (b) a first hydroxyl-containing compound having more than one OH group; (c) an optional second hydroxyl-containing compound having a single OH group, wherein the second hydroxyl-containing compound is a primary alcohol or a secondary alcohol; and (d) an epoxy component. In some embodiments, the epoxy component is present in an amount of 31 weight percent or less, based on the total weight of the polymerizable composition.

In a second aspect, a two-part composition is provided. The two-part composition includes (a) a first part including a polymeric material and (b) a second part including at least one amine. At least one molecule of the at least one amine has an average amine functionality of 2.0 or greater, and each amine is a primary amine or a secondary amine. The polymeric material includes a polymerized reaction product of a polymerizable composition including components. The components include (i) a uretdione-containing material including a reaction product of a diisocyanate reacted with itself; (ii) a first hydroxyl-containing compound having more than one OH group; (iii) an optional second hydroxyl-containing compound having a single OH group, wherein the second hydroxyl-containing compound is a primary alcohol or a secondary alcohol; and (iv) an epoxy component. The polymeric material contains an average of 1.3 or greater of a uretdione functional group in a backbone of the polymeric material.

In a third aspect, a polymerized product is provided. The polymerized product is the polymerized product of the two-part composition according to the second aspect.

In a fourth aspect, a method of adhering two substrates is provided. The method includes (a) obtaining a two-part composition; (b) combining at least a portion of the first part with at least a portion of the second part to form a mixture; (c) disposing at least a portion of the mixture on a first major surface of a first substrate; and (d) contacting a first major surface of a second substrate with the mixture disposed on the first substrate. The two-part composition includes (i) a first part including a polymeric material and (ii) a second part including at least one amine. At least one molecule of the at least one amine has an average amine functionality of 2.0 or greater, and each amine is a primary amine or a secondary amine. The polymeric material includes a reaction product of a polymerizable composition including components. The components include (1) a uretdione-containing material including a reaction product of a diisocyanate reacted with itself; (2) a first hydroxyl-containing compound having more than one OH group; (3) an optional second hydroxyl-containing compound having a single OH group, wherein the second hydroxyl-containing compound is a primary alcohol or a secondary alcohol; and (4) an epoxy component. The polymeric material contains an average of 1.3 or greater of a uretdione functional group in a backbone of the polymeric material.

In a fifth aspect, a method of making a two-part composition is provided. The method includes (a) providing a first part by forming a polymeric material according to the first aspect; and (b) providing a second part including at least one amine. At least one molecule of the at least one amine has an average amine functionality of 2.0 or greater, and each amine is a primary amine or a secondary amine.

The inclusion of the epoxy component imparts a desirable decrease in the viscosity of the polymeric material including uretdione-containing material. The above summary is not intended to describe each embodiment or every implementation of aspects of the invention. The details of various embodiments are set forth in the description below. Other features, objects, and advantages will be apparent from the description and from the claims.

BRIEF DESCRIPTION OF DRAWINGS

FIG. 2 is a schematic cross-sectional view of an exemplary article including two substrates adhered together, preparable according to the present disclosure.

Figure 1:
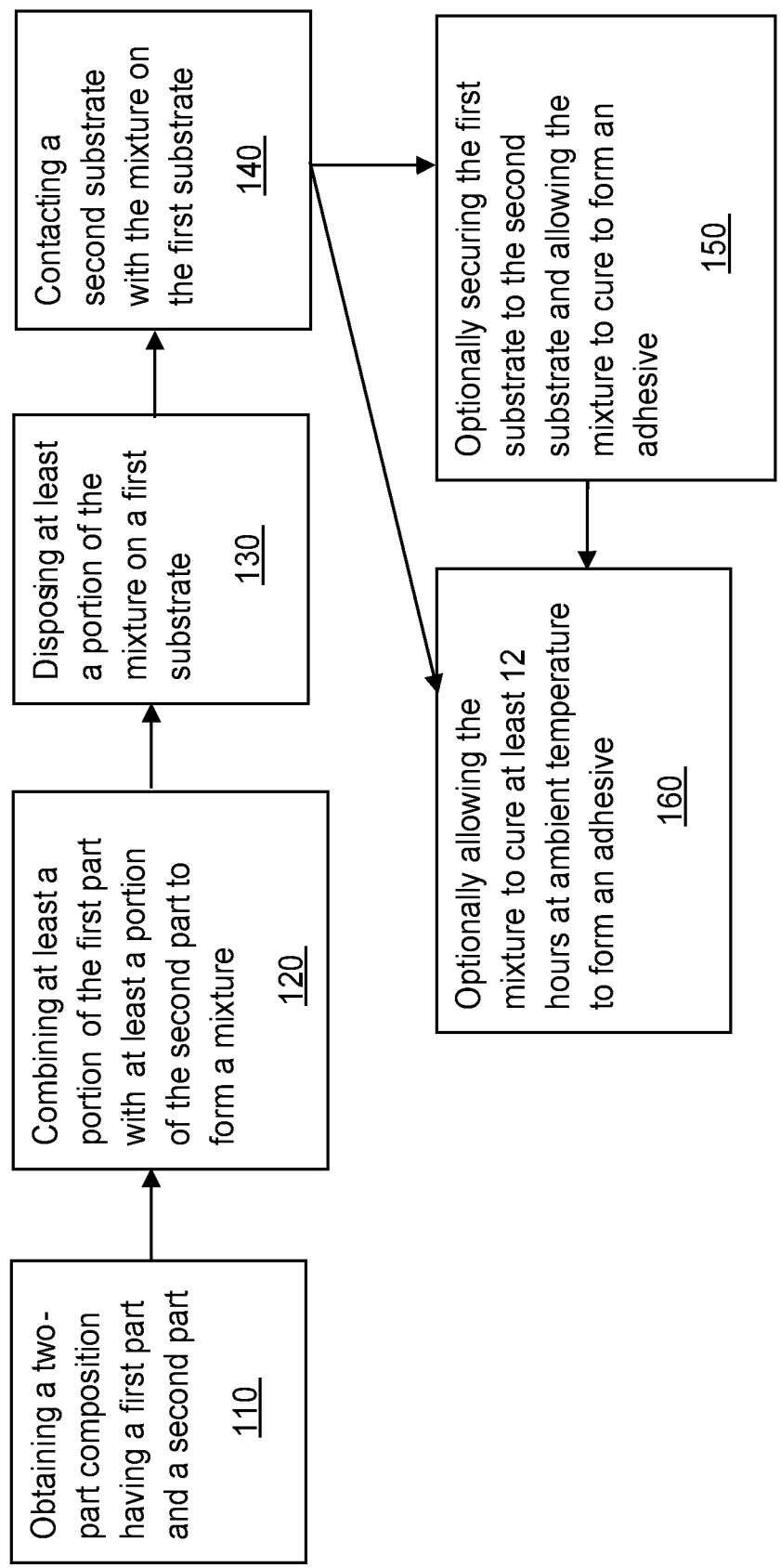
FIG. 1 is a flow chart of an exemplary method of adhering two substrates together, according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The present disclosure provides polymeric materials, polymerizable compositions, and two-part compositions useful for instance in coatings and/or adhesives that have good flowability and reactivity (e.g., without added solvent), acceptable cure and/or adhesion in a short amount of time, as compared to similar compositions instead containing isocyanates. Further, coatings and adhesives according to at least certain embodiments of the present disclosure are essentially free of isocyanates. This is advantageous because isocyanates tend to be sensitizers upon first contact (e.g., to skin) such that subsequent contact causes inflammation. Coatings/adhesives containing isocyanates exhibit more sensitivity to water than other compounds, as noted above, so minimizing an isocyanate content in a coating or adhesive may improve reliability during curing as well as simplify storage and handling of the polymeric materials, polymerizable compositions, and two-part compositions.

The terms "a", "an", "the", "at least one", and "one or more" are used interchangeably.

The term "and/or" means one or both such as in the expression A and/or B refers to A alone, B alone, or to both A and B.

The term "essentially" means 95% or more.

The term "equivalents" refers to the number of moles of a functional group (e.g., OH groups, isocyanate groups, uretdione groups, etc.) per molecule of a polymer chain or per mole of a different functional group.

The term "alkyl" refers to a monovalent radical of an alkane. Suitable alkyl groups can have up to 50 carbon atoms, up to 40 carbon atoms, up to 30 carbon atoms, up to 20 carbon atoms, up to 16 carbon atoms, up to 12 carbon atoms, up to carbon atoms, up to 8 carbon atoms, up to 6 carbon atoms, up to 4 carbon atoms, or up to 3 carbon atoms. The alkyl groups can be linear, branched, cyclic, or a combination thereof. Linear alkyl groups often have 1 to 30 carbon atoms, 1 to 20 carbon atoms, 1 to 10 carbon atoms, 1 to 6 carbon atoms, or 1 to 4 carbon atoms. Branched alkyl groups often have 3 to 50 carbon atoms, 3 to 40 carbon atoms, 4 to 20 carbon atoms, 3 to 10 carbon atoms, or 3 to 6 carbon atoms. Cyclic alkyl groups often have 3 to 50 carbon atoms, 5 to 40 carbon atoms, 6 to 20 carbon atoms, 5 to 10 carbon atoms, or 6 to 10 carbon atoms.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 4 to 14 carbon atoms, 1 to 10 carbon atoms, 1 to 8 carbon atoms, 1 to 6 carbon atoms, or 1 to 4 carbon atoms. The radical centers of the alkylene can be on the same carbon atom (i.e., an alkylidene) or on different carbon atoms. In certain embodiments, the alkylene can be substituted with an OH group.

The term "alkane-triyl" refers to a trivalent radical of an alkane.

The term "aryl" refers to a monovalent group that is radical of an arene, which is a carbocyclic, aromatic compound. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl.

The term "aralkyl" refers to a monovalent group of formula —R—Ar where R is an alkylene and Ar is an aryl group. That is, the aralkyl is an alkyl substituted with an aryl.

The term "aralkylene" refers to a divalent group of formula —R—Ar$^a$— where R is an alkylene and Ar$^a$ is an arylene (i.e., an alkylene is bonded to an arylene).

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The term "alkarylene" refers to a divalent group that is an arylene group substituted with an alkyl group or an arylene group attached to an alkylene group. Unless otherwise indicated, the alkarylene group typically has from 1 to 20 carbon atoms, 4 to 14 carbon atoms, 1 to 10 carbon atoms, 1 to 6 carbon atoms, or 1 to 4 carbon atoms. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms. In certain embodiments, the arylene group or the alkarylene group has 4 to 14 carbon atoms.

The term "aprotic" refers to a component that does not have a hydrogen atom bound to an oxygen (as in a hydroxyl group) or a nitrogen (as in an amine group). In general terms, any component that does not contain labile H+ is called an aprotic component. The molecules of such components cannot donate protons (H+) to other components.

The term "carbamate" refers to a compound having the general formula R—N(H)—C(O)—O—R'. Preferred R groups include alkylene groups.

The term "diisocyanate" refers to a compound having the general formula O=C=N—R—N=C=O. Preferred R groups include alkylene and arylene groups.

The term "diol" refers to a compound with two OH groups.

The term "triamine" refers to a compound with three amino groups.

The term "polyester" refers to repeating difunctional polymer wherein the repeat units are joined by ester linkages. Ester groups have the general formula —R—C(O)—OR'. The term "polyether" refers to repeating difunctional alkoxy radicals having the general formula —O—R—. Preferred R and R' groups have the general formula —C$_n$H$_{2n}$— and include, for example, methylene, ethylene and propylene (including n-propylene and i-propylene) or a combination thereof. Combinations of R and R' groups may be provided, for example, as random or block type copolymers.

The term "polyol" refers to a compound with two or more hydroxyl (i.e., OH) groups.

The term "polymeric material" refers to any homopolymer, copolymer, terpolymer, and the like, as well as any diluent.

The term "non-reactive diluent" refers to a component that can be added to adjust the viscosity of the polymerizable composition. By "non-reactive" it is meant that the diluent does not participate in a polymerization reaction (e.g., with an amine, a uretdione-containing material, or a hydroxyl-containing compound having one or more OH groups), of the polymerizable composition. The diluent does not react with such components during manufacture of a two-part composition, during manufacture of a coating or adhesive, during application of the coating or adhesive to a substrate, or upon aging. Typically, the diluent is substantially free of reactive groups. In some embodiments, the molecular weight of the unreactive diluent is less than the molecular weight of components such as the uretdione-containing material. The non-reactive diluent is not volatile, and substantially remains in the coating or adhesive after curing. The boiling point of the non-reactive diluent may be greater than 200° C.

The term "reactive diluent" refers to a component that can be added to adjust the viscosity of the polymerizable composition and does participate in a polymerization reaction (e.g., with an amine, a uretdione-containing material, or a hydroxyl-containing compound having one or more OH groups), of the polymerizable composition. The diluent reacts with such components during at least one of: during application of the coating or adhesive to a substrate or upon aging. The diluent includes one or more reactive groups, such as epoxy groups. In some embodiments, the molecular weight of the reactive diluent is less than the molecular weight of components such as the uretdione-containing material.

The term "primary alcohol" refers to an alcohol in which the OH group is connected to a primary carbon atom (e.g., having the general formula —CH$_2$OH). The term "secondary alcohol" refers to an alcohol in which the OH group is connected to a secondary carbon atom (e.g., having the general formula —CHROH, where R is a group containing a carbon atom).

The term "ambient temperature" refers to a temperature in the range of 20 degrees Celsius to 25 degrees Celsius, inclusive.

In a first aspect, a polymeric material is provided. The polymeric material includes a polymerized reaction product of a polymerizable composition including components and has a solids content of 90% or greater. The components include a uretdione-containing material including a reaction product of a diisocyanate reacted with itself; a first hydroxyl-containing compound having more than one OH group; an optional second hydroxyl-containing compound having a single OH group; and an epoxy component. The optional second hydroxyl-containing compound is a primary alcohol or a secondary alcohol. Stated another way, the first aspect provides:

A polymeric material comprising a polymerized reaction product of a polymerizable composition comprising components, the components comprising:
(a) a uretdione-containing material comprising a reaction product of a diisocyanate reacted with itself;
(b) a first hydroxyl-containing compound having more than one OH group;
(c) an optional second hydroxyl-containing compound having a single OH group, wherein the second hydroxyl-containing compound is a primary alcohol or a secondary alcohol; and
(d) an epoxy component;
wherein the polymeric material comprises a solids content of 90% or greater.

A uretdione can be formed by the reaction of a diisocyanate with itself and has the following general formula:

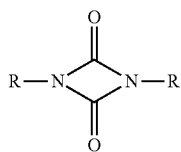

In some embodiments, the diisocyanate comprises a functional group selected from Formula X, Formula XI, and Formula XII:

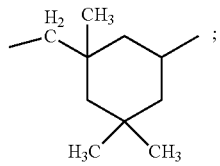

X

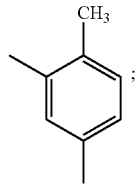

XI

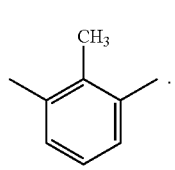

XII

There are a variety of reaction products that can occur as a diisocyanate reacts with itself, and typically the reaction of a diisocyanate with itself results in a blend of two or more reaction products. Preferably, the reaction of a diisocyanate with itself proceeds to a degree such that the polymeric material contains 25% by weight or less or 23% by weight or less of isocyanate groups, as determined by infrared Fourier Transform spectroscopy (e.g., a Nicolet 6700 FT-IP Spectrometer, Thermo Scientific (Madison, Wis.)) where the weight percent of isocyanate in a material is calculated as the moles of isocyanate functional groups multiplied by 42 grams per mole (g/mol) and divided by the mass of the material.

In certain embodiments, the uretdione-containing material comprises a compound of Formula I:

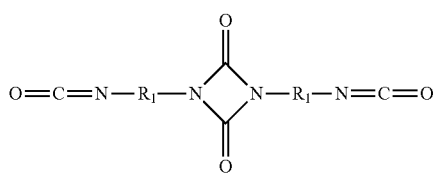

I wherein R$_1$ is independently selected from a C$_4$ to C$_{14}$ alkylene, arylene, and alkaralyene. In some embodiments, the diisocyanate comprises hexamethylene diisocyanate. One preferable uretdione-containing material is a hexamethylene diisocyanate-based blend of materials comprising uretdione functional groups, commercially available under the trade name DESMODUR N3400 from Covestro (Leverkusen, Germany). Additional uretdione-containing materials are commercially available under the trade name CRELAN EF 403 also from Covestro, and under the trade name METALINK U/ISOQURE TT from Isochem Incorporated (New Albany, Ohio).

Typically, the polymeric material comprises greater than one uretdione functional group in a backbone of the polymeric material, such as an average of 1.1 or greater of a uretdione functional group in a backbone of the polymeric material, 1.2 or greater, 1.3 or greater, 1.4 or greater, 1.5 or greater, 1.6 or greater, 1.8 or greater, 2.0 or greater, 2.2 or greater, 2.4 or greater, 2.6 or greater, 2.8 or greater, 3.0 or greater, 3.2 or greater, 3.4 or greater, or 3.6 or greater; and an average of 6.0 or less of a uretdione functional group in a backbone of the polymeric material, 5.8 or less, 5.6 or less, 5.4 or less, 5.2 or less, 5.0 or less, 4.8 or less, 4.6 or less, 4.4 or less, 4.2 or less, 4.0 or less, 3.8 or less, 3.5 or less, 3.3 or less, 3.1 or less, 2.9 or less, 2.7 or less, 2.5 or less, 2.3 or less, 2.1 or less, or even an average of 1.9 or less of a uretdione functional group in a backbone of the polymeric material. Stated another way, the polymeric material may comprise an average of 1.3 to 6.0, inclusive, or 1.5 to 4.0, inclusive, of a uretdione functional group in a backbone of the polymeric material. In select embodiments, the polymeric material comprises an average of 1.3 to 5.0, inclusive, of a uretdione functional group in a backbone of the polymeric material and the polymerizable composition is free of the second hydroxyl-containing compound. The amount of the uretdione functional group can be determined as described in the Examples below.

One exemplary simplified general reaction scheme of a uretdione-containing material with a first-hydroxyl-containing compound and an (optional) second hydroxyl-containing compound is provided below in Scheme 1:

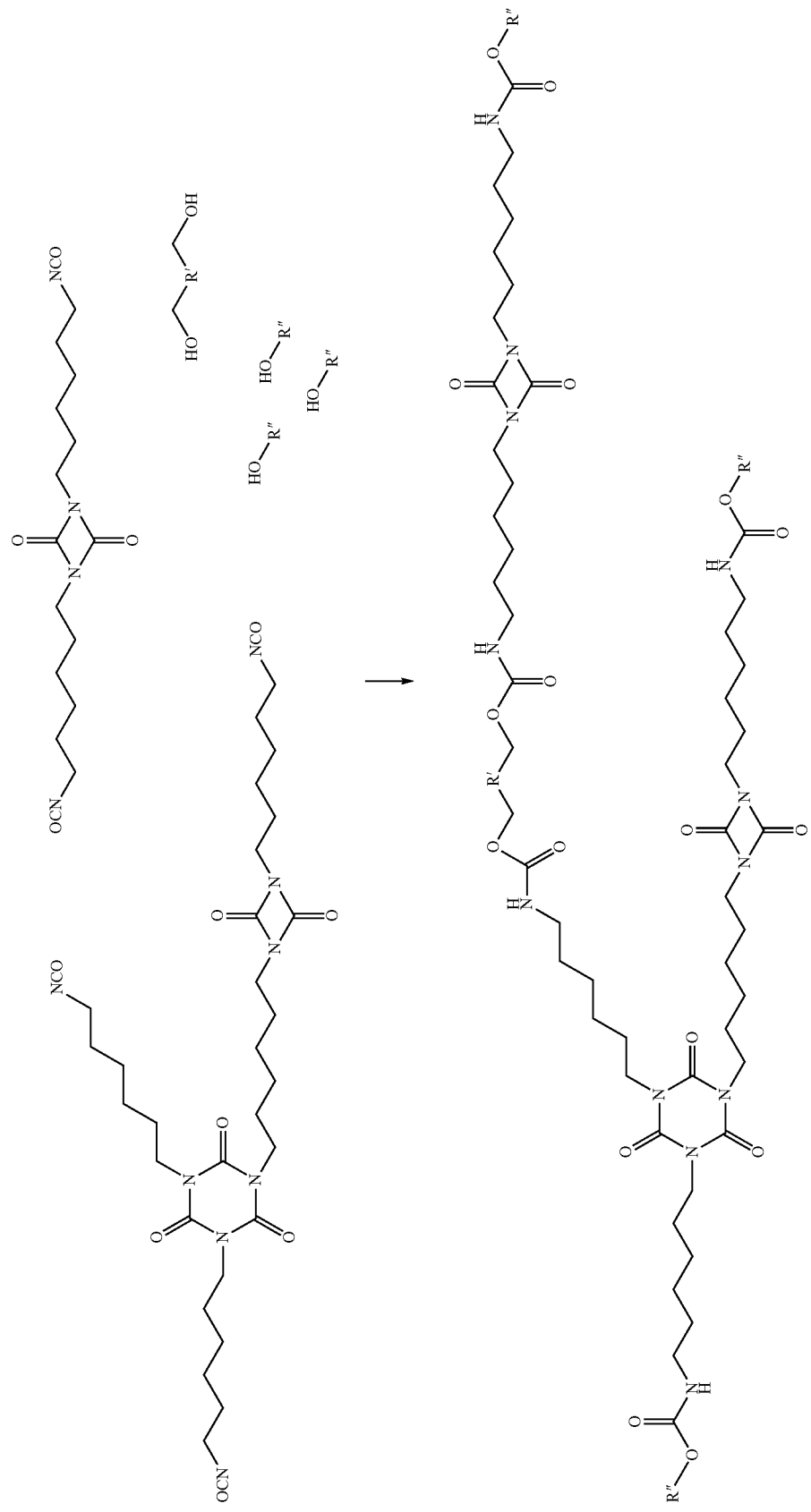
Scheme 1

In the particular reaction scheme of Scheme 1, the uretdione-containing material comprises two compounds containing uretdione groups, one of which also contains an isocyanurate compound. In certain embodiments of the polymeric material, the polymeric material comprises an average of 1.3 or fewer isocyanurate units per molecule of the polymeric material. This can be because isocyanurate units may not contribute desirable properties to the polymeric material.

Similarly, an exemplary simplified general reaction scheme of a uretdione-containing material with a first-hydroxyl-containing compound, but without the optional second hydroxyl-containing compound is provided below in Scheme 2:

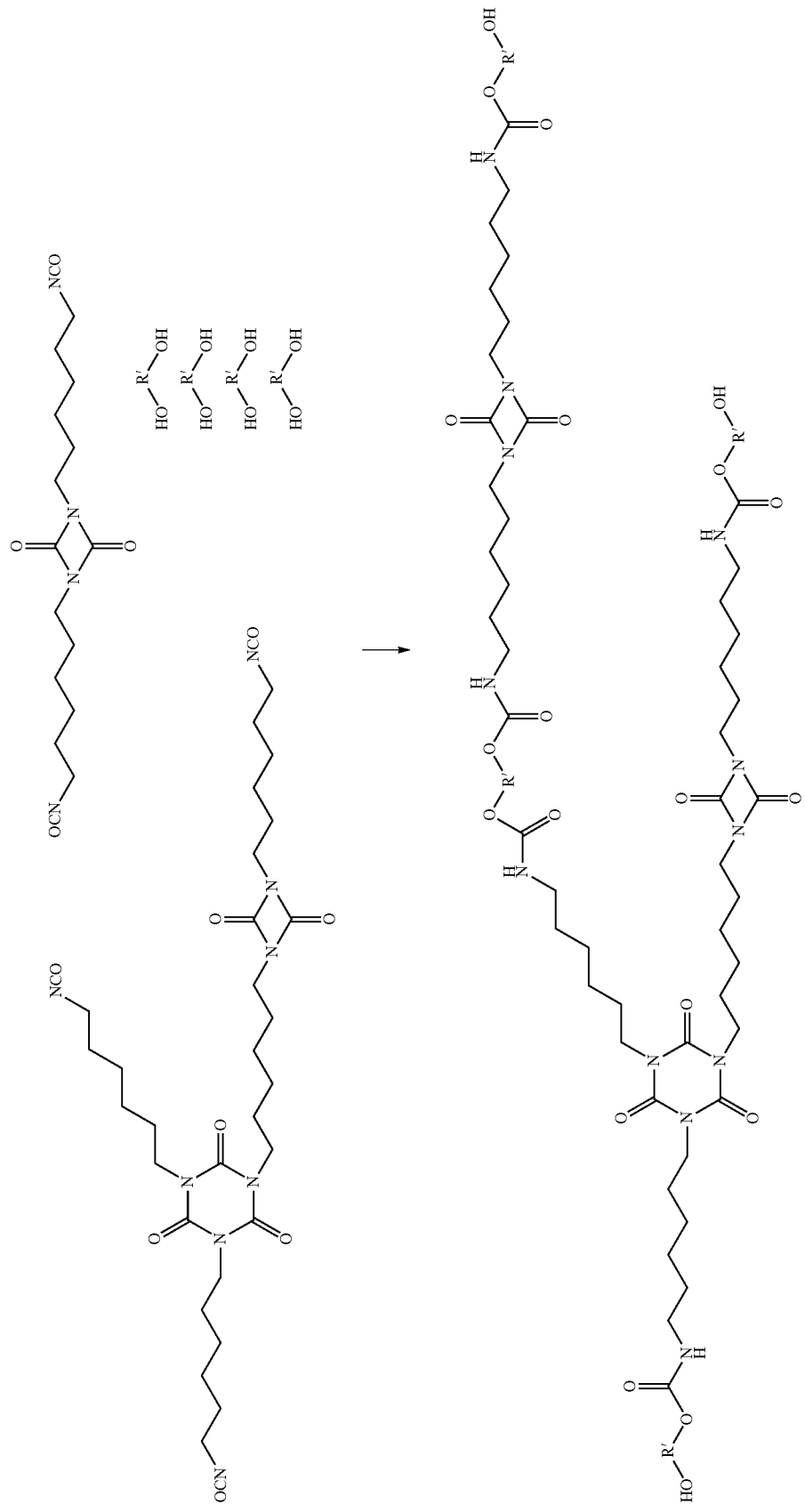
Scheme 2

The polymeric material also typically comprises one or more carbamate functional groups per molecule of the polymeric material in a backbone of the polymeric material. The carbamate functional groups are formed by the reaction of the first hydroxyl-containing compound (and optionally the second hydroxyl-containing compound) with the isocyanate groups present on uretdione-containing compounds. For example, the polymeric material may comprise an average of 0.2 or greater of carbamate functional groups in the backbone of the polymeric material, 0.5 or greater, 1 or greater, 2 or greater, 3 or greater, 4 or greater, 5 or greater, 6 or greater, 7 or greater, or an average of 8 or greater of carbamate functional groups in the backbone of the polymeric material; and an average of 18 or less of carbamate functional groups in the backbone of the polymeric material, 17 or less, 16 or less, 15 or less, 14 or less, 13 or less, 12 or less, 11 or less, 10 or less, or an average of 9 or less of carbamate functional groups in the backbone of the polymeric material. Stated another way, the polymeric material may comprise an average of 0.2 to 18, inclusive, or 2 to 10, inclusive, of carbamate functional groups in the backbone of the polymeric material. The average carbamate functional group content of the polymeric material can be determined as described in the Examples below.

In certain embodiments, the first hydroxyl-containing compound is an alkylene polyol, a polyester polyol, or a polyether polyol. Often the first hydroxyl-containing compound is a diol, such as a branched diol. For example, in some embodiments the first hydroxyl-containing compound is of Formula II:

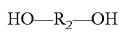  II wherein $R_2$ is selected from $R_3$, an alkylene, and an alkylene substituted with an OH group, wherein $R_3$ is of Formula III or Formula IV:

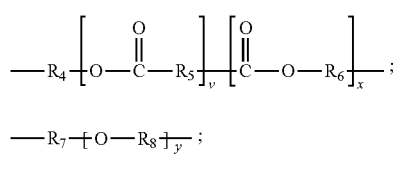  III

IV wherein each of $R_4$, $R_5$, $R_6$, $R_7$, and $R_8$ is independently an alkylene, wherein each of v and y is independently 1 to 40, and wherein x is selected from 0 to 40. Optionally, $R_2$ is selected from $C_1$ to $C_{20}$ alkylene and a $C_1$ to $C_{20}$ alkylene substituted with an OH group.

In certain embodiments of the first hydroxyl-containing compound, each of $R_4$, $R_5$, $R_6$, $R_7$, and $R_8$ is independently selected from a $C_1$ to $C_{20}$ alkylene. Alternatively, the first hydroxyl-containing compound can be of Formula V or Formula VI:

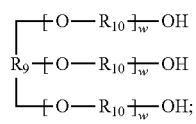  V

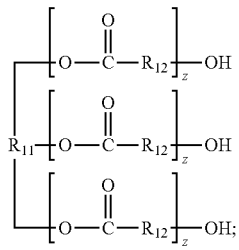  VI wherein each of $R_9$ and $R_{11}$ is independently an alkanetriyl, wherein each of $R_{10}$ and $R_{12}$ is independently selected from an alkylene, and wherein each of w and z is independently selected from 1 to 20. Preferably, each of $R_{10}$ and $R_{12}$ is independently selected from a $C_1$ to $C_{20}$ alkylene.

Suitable first hydroxyl-containing compounds include branched alcohols, secondary alcohols, or ethers, for instance and without limitation, 2,2-dimethyl-1,3-propanediol, 2-methyl-1,3-propanediol, diethylene glycol, poly(tetramethylene ether) glycol, 2-ethylhexane-1,3-diol, and 1,3-butanediol. Such suitable first hydroxyl-containing compounds are commercially available from chemical suppliers including for example, Alfa Aesar (Ward Hill, Mass.), JT Baker (Center Valley, Pa.), TCI (Portland, Oreg.), and Fisher Scientific (Waltham, Mass.).

In certain embodiments, the optional second hydroxyl-containing compound is an alkyl alcohol, a polyester alcohol, or a polyether alcohol, such as a branched alcohol and/or a secondary alcohol. For example, in some embodiments the second hydroxyl-containing compound is present and is of Formula VII:

  VII;

wherein $R_{13}$ is selected from $R_{14}$, $R_{15}$, and a $C_1$ to $C_{50}$ alkyl;

wherein $R_{14}$ is of Formula VIII:

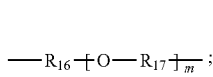  VIII wherein m=1 to 20, $R_{16}$ is an alkyl, and $R_{17}$ is an alkylene; wherein $R_{15}$ is of Formula IX:

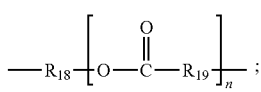  IX wherein n=1 to 20, $R_{18}$ is an alkyl, and Rig is an alkylene. Preferably, $R_{13}$ is a $C_4$-$C_{20}$ alkyl, as the alkyl groups below $C_4$ have a tendency to form a crystalline polymeric material.

Suitable optional second hydroxyl-containing compounds can include branched alcohols or secondary alcohols, for instance and without limitation, 2-butanol, 2-ethyl-1-hexanol, isobutanol, and 2-butyl-octanol, each of which is commercially available from Alfa Aesar (Ward Hill, Mass.).

In an embodiment, first hydroxyl-containing compound is of Formula II and the optional second hydroxyl-containing compound is present and of Formula VII, wherein $R_2$ of the compound of Formula II is of Formula III, and wherein $R_{13}$ of the compound of Formula VII is a branched $C_4$ to $C_{20}$ alkyl.

In select embodiments, the first hydroxyl-containing compound is a diol and the reaction product comprises 0.2 to 0.65, inclusive, or 0.25 to 0.61, inclusive, of diol equivalents relative to isocyanate equivalents. Optionally, a sum of the OH equivalents of the first hydroxyl-containing compound and the (optional) second hydroxyl-containing compound is equal to or greater than the isocyanate equivalents of the polymeric material.

Preferably, the polymeric material is essentially free of isocyanates. By "essentially free of isocyanates" it is meant that the polymeric material contains 5% by weight or less, 4% by weight or less, 3% by weight or less, 2% by weight or less, or 1% by weight or less of isocyanate groups, as determined by infrared Fourier Transform spectroscopy (e.g., a Nicolet 6700 FT-IP Spectrometer, Thermo Scientific (Madison, Wis.)), where the weight percent of isocyanate in a material is calculated as the moles of isocyanate functional groups multiplied by 42 g/mol and divided by the mass of the material.

The components include at least one epoxy component. It has been discovered that the introduction of a reactive epoxy diluent results in an improvement in the viscosity of a polymeric material including a uretdione-containing material, such that use of crystalline or high viscosity uretdione-containing materials has been enabled.

The epoxy component may optionally include an epoxy resin comprising one or more epoxy compounds that can be monomeric or polymeric, and aliphatic, cycloaliphatic, heterocyclic, aromatic, hydrogenated, and/or a mixture thereof. Preferred epoxy compounds contain more than 1.5 epoxy groups per molecule and more preferably at least 2 epoxide groups per molecule.

The epoxy component can include linear polymeric epoxides having terminal epoxy groups (e.g., a diglycidyl ether of a polyoxyalkylene glycol), polymeric epoxides having skeletal epoxy groups (e.g., polybutadiene poly epoxy), polymeric epoxides having pendant epoxy groups (e.g., a glycidyl methacrylate polymer or copolymer), or a mixture thereof.

Exemplary epoxy compounds include, for example, aliphatic (including cycloaliphatic) and aromatic epoxy compounds. The epoxy compound(s) may be monomeric, oligomeric, or polymeric epoxides, or a combination thereof. The epoxy component may be a pure compound or a mixture comprising at least two epoxy compounds. The epoxy component typically has, on average, at least 1 epoxy (i.e., oxiranyl) group per molecule, preferably at least about 1.5 and more preferably at least about 2 epoxy groups per molecule. Hence, the epoxy component may comprise at least one monofunctional epoxy, and/or may comprise at least one multifunctional epoxy. In some cases, 3, 4, 5, or even 6 epoxy groups may be present, on average. Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). Other useful epoxy components are polyhydric phenolic formaldehyde condensation products as well as polyglycidyl ethers that contain as reactive groups only epoxy groups or hydroxy groups. In certain embodiments, the epoxy component comprises at least one glycidyl ether group. The "average" number of epoxy groups per molecule can be determined by dividing the total number of epoxy groups in the epoxy-containing material by the total number of epoxy-containing molecules present.

The choice of epoxy component may depend upon the intended end use. For example, epoxides with flexible backbones may be desired where a greater amount of ductility is needed in the bond line. Materials such as diglycidyl ethers of bisphenol A and diglycidyl ethers of bisphenol F can help impart desirable structural adhesive properties upon curing, while hydrogenated versions of these epoxies may be useful for compatibility with substrates having oily surfaces.

Commercially available epoxy compounds include octadecylene oxide, epichlorohydrin, styrene oxide, vinylcyclohexene oxide, glycidol, glycidyl methacrylate, vinylcyclohexene dioxide, 3,4-epoxycyclohexylmethyl-3,4-epoxycyclohexenecarboxylate, 3,4-epoxy-6-methylcyclohexylmethyl-3,4-epoxy-6-methylcyclohexene carboxylate, bis(3,4-epoxy-6-methylcyclohexylmethyl) adipate, bis(2,3-epoxycyclopentyl) ether, dipentene dioxide, silicone resin containing epoxy functionality, flame retardant epoxy resins (e.g., DER-580, a brominated bisphenol type epoxy resin available from Dow Chemical Co.), 1,4-butanediol diglycidyl ether of phenol-formaldehyde novolac (e.g., DEN-431 and DEN-438 from Dow Chemical Co.), and resorcinol diglycidyl ether (e.g., Kopoxite from Koppers Company, Inc.), bis(3,4-epoxycyclohexyl)adipate, 2-(3,4-epoxycyclohexyl-5,5-spiro-3,4-epoxy) cyclohexene metadioxane, vinylcyclohexene monoxide 1,2-epoxyhexadecane, alkyl glycidyl ethers such as (e.g., HELOXY Modifier 7 from Momentive Specialty Chemicals, Inc., Waterford, N.Y.), alkyl C12-C14 glycidyl ether (e.g., HELOXY Modifier 8 from Momentive Specialty Chemicals, Inc.), butyl glycidyl ether (e.g., HELOXY Modifier 61 from Momentive Specialty Chemicals, Inc.), cresyl glycidyl ether (e.g., HELOXY Modifier 62 from Momentive Specialty Chemicals, Inc.), p-tert-butylphenyl glycidyl ether (e.g., HELOXY Modifier 65 from Momentive Specialty Chemicals, Inc.), polyfunctional glycidyl ethers such as diglycidyl ether of 1,4-butanediol (e.g., HELOXY Modifier 67 from Momentive Specialty Chemicals, Inc.), diglycidyl ether of neopentyl glycol (e.g., HELOXY Modifier 68 from Momentive Specialty Chemicals, Inc.), diglycidyl ether of cyclohexanedimethanol (e.g., HELOXY Modifier 107 from Shell Chemical Co.), trimethylolethane triglycidyl ether (e.g., HELOXY Modifier 44 from Momentive Specialty Chemicals, Inc.), trimethylolpropane triglycidyl ether (e.g., HELOXY Modifier 48 from Momentive Specialty Chemicals, Inc.), polyglycidyl ether of an aliphatic polyol (e.g., HELOXY Modifier 84 from Momentive Specialty Chemicals, Inc.), polyglycol diepoxide (e.g., HELOXY Modifier 32 from Momentive Specialty Chemicals, Inc.), bisphenol F epoxides, 9,9-bis[4-(2, 3-epoxypropoxy)phenyl]fluorenone (e.g., EPON 1079 from Momentive Specialty Chemicals, Inc.).

In some embodiments, the epoxy component contains one or more epoxy compounds having an epoxy equivalent weight of from 100 g/mole to 1500 g/mol. More preferably, the epoxy resin contains one or more epoxy compounds having an epoxy equivalent weight of from 300 g/mole to 1200 g/mole. Even more preferably, the curable composition contains two or more epoxy compounds, wherein at least one epoxy resin has an epoxy equivalent weight of from 300 g/mole to 500 g/mole, and at least one epoxy resin has an epoxy equivalent weight of from 1000 g/mole to 1200 g/mole.

Useful epoxy compounds also include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2'-, 2,3'-, 2,4'-, 3,3'-, 3,4'-, and 4,4'-isomers of dihydroxydiphenylmethane, dihydroxydiphenyldimethylmethane, dihydroxydiphenylethylmethylme thane, dihydroxydiphenylmethylpropylme thane, dihydroxy-diphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Exemplary epoxy compounds also include glycidyl ethers of bisphenol A, bisphenol F, and novolac resins as well as glycidyl ethers of aliphatic or cycloaliphatic diols. Examples of commercially available glycidyl ethers include diglycidyl ethers of bisphenol A such as those available as EPON 828, EPON 1001, EPON 1310, and EPON 1510 from Hexion Specialty Chemicals GmbH, Rosbach, Germany; those available under the trade name D.E.R. (e.g., D.E.R. 331, 332, and 334) from Dow Chemical Co., Midland, Mich.; those available under the trade name EPICLON from Dainippon Ink and Chemicals, Inc. (e.g., EPICLON 840 and 850) and those available under the trade name YL-980 from Japan Epoxy Resins Co., Ltd.); diglycidyl ethers of bisphenol F (e.g., those available under the trade name EPICLON from Dainippon Ink and Chemicals, Inc. (e.g., EPICLON 830)); glycidyl ethers of novolac resins (e.g., novolac epoxy resins, such as those available under the trade name D.E.N. from Dow Chemical Co. (e.g., D.E.N. 425, 431, and 438)); and flame retardant epoxy resins (e.g., D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred. In some embodiments, nitrile rubber modified epoxies may be used (e.g., KELPDXY 1341 available from CVC Chemical).

In some embodiments, the epoxy component has a specified Log water octanol partition coefficient (Log P). Although various methods have been described for determining the Log P of a compound, as used herein, Log P refers to the value obtained by the Moriguchi method (See Moriguchi, I; Hirono, S; Qian, L.; Nakagome, I.; and Matsushita, Y; Chemical and Pharmaceutical Bulletin, 40 (1992): 127)). The computations were conducted utilizing the software program Molecular Modeling Pro Plus from Norgwyn Montgomery Software, Inc. (North Wales, Pa.).

Log P is defined as the partitioning of the concentrations of a compound in octanol versus water:

$$\text{Log } P = [\text{compound}]_{octanol}/[\text{compound}]_{water}$$

Higher values of Log P are more hydrophobic, while lower values of Log P are more hydrophilic. The Moriguchi method predicts Log P via a correlation developed employing over 1200 organic molecules having a wide variety of structures. Optionally, the epoxy component exhibits a Log water octanol partition coefficient (Log P) according to the Moriguchi method of less than 27.5, less than 25, less than 23, less than 20, less than 18, less than 16, less than 14, less than 12, less than 10, less than 8, less than 6, less than 5, less than 4, less than 3, or even less than 2.3.

Low viscosity epoxy compound(s) may be included in the epoxy component, for example, to reduce viscosity as noted above. For instance, in some embodiments, the epoxy component exhibits a dynamic viscosity of 10,000 centipoises (cP) or less, 9,000 cP or less, 8,000 cP or less, 7,000 cP or less, 6,000 cP or less, 5,000 cP or less, 4,000 cP or less, or 3,000 cP or less, as determined using a Brookfield viscometer. Conditions for the dynamic viscosity test include use of a LV4 spindle at a speed of 0.3 or 0.6 revolutions per minute (RPM) at 24 degrees Celsius. In some embodiments, one or more epoxy components each has a molecular weight of 2,000 grams per mole or less. Examples of low viscosity epoxy compounds include: cyclohexanedimethanol diglycidyl ether, resorcinol diglycidyl ether, p-tert-butylphenyl glycidyl ether, cresyl glycidyl ether, diglycidyl ether of neopentyl glycol, triglycidyl ether of trimethylolethane, triglycidyl ether of trimethylolpropane, triglycidyl p-aminophenol, N,N'-diglycidylaniline, N,N,N',N'-tetraglycidyl meta-xylylenediamine, and vegetable oil polyglycidyl ether.

In some embodiments, the amount of the epoxy component is 1% by weight or greater, based on the total weight of the polymerizable composition, 5% by weight or greater, 7% by weight or greater, 9% by weight or greater, 12% by weight or greater, 15% by weight or greater, 18% by weight or greater, 21% by weight or greater, 24% by weight or greater, or 26% by weight or greater, based on the total weight of the polymerizable composition; and 31% by weight or less, 29% by weight or less, 27% by weight or less, 25% by weight or less, 23% by weight or less, 20% by weight or less, 17% by weight or less, 14% by weight or less, or 10% by weight or less, based on the total weight of the polymerizable composition. In select embodiments, the epoxy component is added in an amount of 1 to 31 percent by weight or 5 to 25 percent by weight, based on the total weight of the polymerizable composition.

In some embodiments, the epoxy component is not present at the time of the polymerization of the polymerizable composition containing the components of (a) a uretdione-containing material comprising a reaction product of a diisocyanate reacted with itself, (b) a first hydroxyl-containing compound having more than one OH group, and, if present, (c) a second hydroxyl-containing compound having a single OH group. In such embodiments, components (a), (b), and, if present, (c), are reacted, and then the epoxy component is combined with the reaction product of components (a), (b), and, if present, (c).

In alternate embodiments, the epoxy component is present at the time of reaction of components (a), (b), and, if present, (c). In such embodiments, it is preferred that most or all the epoxy component does not participate in the polymerization of the polymerizable components including components (a), (b), and, if present, (c), but rather remains available for later reaction (e.g., with a curative).

The polymeric material may further comprise one or more additives, e.g., catalysts, plasticizers, non-reactive diluents, toughening agents, fillers, flow control agents, colorants (e.g., pigments and dyes), adhesion promoters, UV stabilizers, flexibilizers, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the tradename EXPANCEL by Expancel Inc. (Duluth, Ga.).

For example, suitable catalysts can include tertiary amines, amidines, or organometallic catalysts such as tin compounds, bismuth compounds, zinc compounds, and zirconium compounds. Optionally, a bismuth carboxylate may be a suitable catalyst, for instance bismuth neodecanoate and/or bismuth ethylhexanoate. In select embodiments, the polymeric material is free of catalysts that contain tin. Either catalysts or retarders can be added to change the cure profile of the amine with the polymeric material. They can be included in either part of a two-part composition; with the polymeric material or with the amine. Suitable non-reactive diluents can include benzoate esters, for instance and without limitation ethyl benzoate, ethylhexyl benzoate, ethylhexyl hydroxystearate benzoate, C12-C15 alkyl benzoates, and dipropylene glycol dibenzoate. A commercially available non-reactive diluent includes the material available under the tradename BENZOFLEX 131 from Eastman Chemical (Kingsport, Tenn.). Additionally, organic and/or inorganic acids can be utilized as retarders to delay the cure or extend the pot-life of the material. For example, suitable acids can include carboxylic acids.

A plasticizer is often added to a polymeric material to make the polymeric material more flexible, softer, and more workable (e.g., easier to process). More specifically, the mixture resulting from the addition of the plasticizer to the polymeric material typically has a lower glass transition temperature compared to the polymeric material alone. The glass transition temperature of a polymeric material can be lowered, for example, by at least 30 degrees Celsius, at least 40 degrees Celsius, at least 50 degrees Celsius, at least 60 degrees Celsius, or at least 70 degrees Celsius by the addition of one or more plasticizers. The temperature change (i.e., decrease) tends to correlate with the amount of plasticizer added to the polymeric material. It is the lowering of the glass transition temperature that usually leads to the increased flexibility, increased elongation, and increased workability. Some example plasticizers include various phthalate esters such as diethyl phthalate, diisobutyl phthalate, dibutyl phthalate, diisoheptyl phthalate, dioctyl phthalate, diisooctyl phthalate, dinonyl phthalate, diisononyl phthalate, diisodecyl phthalate, and benzylbutyl phthalate; various adipate esters such as di-2-ethylhexyl adipate, dioctyl adipate, diisononyl adipate, and diisodecyl adipate; various phosphate esters such as tri-2-ethylhexyl phosphate, 2-ethylhexyl diphenyl phosphate, trioctylphosphate, and tricresyl phosphate; various trimellitate esters such as tris-2-ethylhexyl trimellitate and trioctyl trimellitate; various sebacate and azelate esters; and various sulfonate esters. Other example plasticizers include polyester plasticizers that can be formed by a condensation reaction of propanediols or butanediols with adipic acid. Commercially available plasticizers include those available under the tradename JAYFLEX DINA available from ExxonMobil Chemical (Houston, Tex.) and PLASTOMOLL (e.g., diisononyl adipate) from BASF (Florham Park, N.J.).

Another optional additive is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the tradenames ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the tradenames KANE ACE (e.g., KANE ACE MX 157, KANE ACE MX 257, and KANE ACE MX 125) from Kaneka Corporation (Japan).

Another class of polymeric toughening agents that are capable of forming, with the epoxy component, a rubbery phase on curing, are carboxyl-terminated butadiene acrylonitrile compounds. Commercially available carboxyl-terminated butadiene acrylonitrile compounds include those available under the tradenames HYCAR (e.g., HYCAR 1300X8, HYCAR 1300X13, and HYCAR 1300X17) from Lubrizol Advanced Materials, Inc. (Cleveland, Ohio) and under the tradename PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt. % to 40 wt. % of the total graft polymer, so that the polymerized thermoplastic portion constitutes from 5 wt. % to 60 wt. % of the graft polymer.

Still other polymeric toughening agents are polyether sulfones such as those commercially available from BASF (Florham Park, N.J.) under the tradename ULTRASON (e.g., ULTRASON E 2020 P SR MICRO).

Further optional additives include a flow control agent or thickener, to provide the desired rheological characteristics to the polymeric material. Suitable flow control agents include fumed silica, such as treated fumed silica, available under the tradename CAB-O-SIL TS 720, and untreated fumed silica available under the tradename CAB-O-SIL M5, from Cabot Corp. (Alpharetta, Ga.).

In some embodiments, the polymeric material optimally contains adhesion promoters other than the silane adhesion promoter to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The polymeric material optionally may also contain one or more fillers (e.g., aluminum powder, carbon black, glass bubbles, talc, clay, calcium carbonate, barium sulfate, titanium dioxide, silica such as fused silica, silicates, glass beads, and mica). Particulate fillers can be in the form of flakes, rods, spheres, and the like.

The amount and type of such additives may be selected by one skilled in the art, depending on the intended end use of the composition.

In certain embodiments, the polymeric material is used in an application where it is disposed between two substrates, wherein solvent removal (e.g., evaporation) is restricted, especially when one or more of the substrates comprises a moisture impermeable material (e.g., steel or glass). In such cases, the polymeric material comprises a solids content of 90% or greater, 92% or greater, 94% or greater, 95% or greater, 96% or greater, 98% or greater, or 99% or greater. Likewise, in such embodiments where solvent removal is restricted, the first part, the second part, or both parts of a two-part composition according to the present disclosure comprises a solids content of 90% or greater, 92% or greater, 94% or greater, 95% or greater, 96% or greater, 98% or greater, or 99% or greater. Components that are considered "solids" include, for instance and without limitation, polymers, oligomers, monomers, hydroxyl-containing compounds, and additives such as plasticizers, catalysts, non-reactive diluents, and fillers. Typically, only solvents do not fall within the definition of solids, for instance water or organic solvents.

For convenient handleability, the polymeric material typically comprises a dynamic viscosity of 10 Poise (P) or greater as determined using a Brookfield viscometer, 50 P or greater, 100 P or greater, 150 P or greater, 250 P or greater, 500 P or greater, 1,000 P or greater, 1,500 P or greater, 2,000 P or greater, 2,500 P or greater, or even 3,000 P or greater; and 10,000 P or less, 9,000 P or less, 8,000 P or less, 7,000 P or less, 6,000 P or less, 5,000 P or less, or even 4,000 P or less, as determined using a Brookfield viscometer. Stated another way, the polymeric material may exhibit a dynamic viscosity of 10 Poise (P) to 10,000 P, inclusive, 10 P to 6,000 P, or 10 P to 4,000 P, inclusive, as determined using a Brookfield viscometer. Conditions for the dynamic viscosity test include use of a LV4 spindle at a speed of 0.3 or 0.6 revolutions per minute (RPM) at 24 degrees Celsius.

The polymerizable compositions are often in the form of a two-part composition. Hence, in a second aspect, a two-part composition is provided. The two-part composition includes (a) a first part including a polymeric material and (b) a second part including at least one amine. At least one molecule of the at least one amine has an average amine functionality of 2.0 or greater, and each amine is a primary amine or a secondary amine. The polymeric material includes a polymerized reaction product of a polymerizable composition including components. The components include (i) a uretdione-containing material including a reaction product of a diisocyanate reacted with itself; (ii) a first hydroxyl-containing compound having more than one OH group; (iii) an optional second hydroxyl-containing compound having a single OH group, wherein the second hydroxyl-containing compound is a primary alcohol or a secondary alcohol; and (iv) an epoxy component. The polymeric material contains an average of 1.3 or greater of a uretdione functional group in a backbone of the polymeric material. Stated another way, the two-part composition includes:

(a) a first part comprising a polymeric material comprising:
  a polymerized reaction product of a polymerizable composition comprising components, the components comprising:
    (i) a uretdione-containing material comprising a reaction product of a diisocyanate reacted with itself;
    (ii) a first hydroxyl-containing compound having more than one OH group;
    (iii) an optional second hydroxyl-containing compound having a single OH group, wherein the second hydroxyl-containing compound is a primary alcohol or a secondary alcohol;
    and
    (iv) an epoxy component;
  wherein the polymeric material comprises an average of 1.3 or greater of a uretdione functional group in a backbone of the polymeric material; and
(b) a second part comprising at least one amine, at least one molecule of the at least one amine having an average amine functionality of 2.0 or greater, wherein each amine is a primary amine or a secondary amine.

Two-part compositions according to the present disclosure use the basic chemical reaction from Scheme 3 below, i.e., a polymeric material comprising a uretdione-containing material and an epoxy component in one part of the system and a multifunctional amine in the other part of the system. When the amine curative is mixed with the uretdione-containing material and epoxy component, the amine opens the uretdione to form a biuret and opens the epoxy ring. This produces an isocyanate-free coating or adhesive system according to Scheme 3:

Scheme 3

Advantageously, the same amine curatives and catalysts are typically effective in reacting

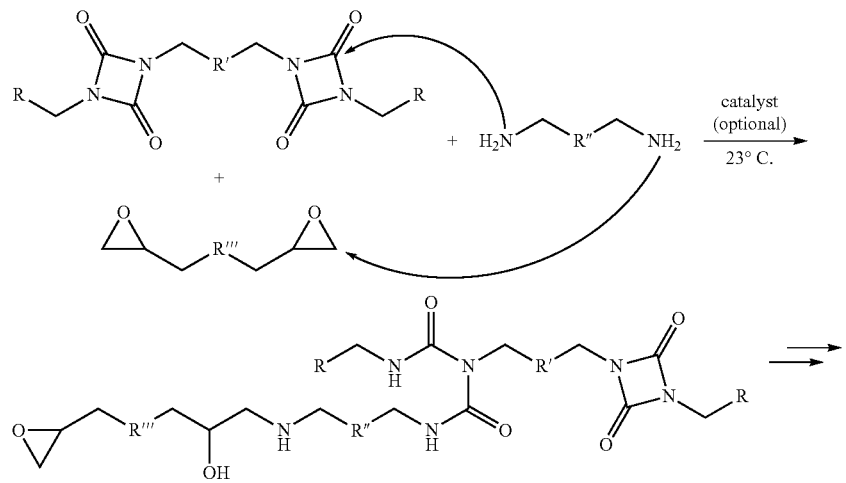

and catalyzing, respectively, both uretdione functional groups and epoxy functional groups.

Some primary amines, such as diethylenetriamine and other oligomers of ethylenediamine are not preferred because they exhibit a reactivity that is too swift to achieve mixing and application of the adhesive before polymerization of two-part compositions has occurred according to the present disclosure. For example, some steric hindrance of the amine is helpful to decrease the reaction rate to a suitable speed for essentially complete reaction of the first part with the second part. The average functionality is relevant, thus the second part can include a mixture of amines with different functionalities as long as the average is 2.0 or greater. Preferably, the average functionality is greater than 2.0 (such as 2.2 or greater, 2.4 or greater, 2.6 or greater, 2.8 or greater, or 3.0 or greater). Moreover, if the amine is not sufficiently miscible with the first part of the two-part composition, (e.g., tends to separate from the first part upon mixture of the first part and the second part of a two-part composition), then that amine is not suitable for reaction with that first part. It has been found that many primary aliphatic amines (e.g., an amine group located on an alkane group) react too swiftly with uretdione-containing materials to allow essentially complete reaction of the two-part composition according to at least certain embodiments of the present disclosure.

The polymeric material also needs to have enough of a uretdione group functionality per molecule of polymeric material to allow for curing of a two-part composition into an effective polymer network when reacted with an amine. Typically, the polymeric material comprises an average of 1.3 to 6.0 inclusive, of a uretdione functional group in a backbone of the polymeric material. It is usually advantageous for the first part (e.g., the polymeric material, the first hydroxyl-containing compound, and the optional second hydroxyl-containing compound) to be flowable, (e.g., to allow for mixing with the second part) and to readily wet the surface of either a substrate to be coated or two substrates to be adhered. To provide a uretdione-containing polymeric material that has a relatively low viscosity at a high solids content, the composition of the polymeric material should have minimal crystallinity, which can be achieved through the inclusion of the reactive diluent epoxy component. In published reports, uretdione-containing materials used in solvent-borne coatings have had a molecular weight that is too high be practical in the adhesive systems having 90% or greater solids content without also including an epoxy component. Further, it has been found that the amount of diol in a first part of a two-part composition can be included in a range of about 0.2 to 0.65 equivalents relative to the isocyanate equivalents to achieve a suitable viscosity and a sum of the OH equivalents of the first hydroxyl-containing compound and the optional second hydroxyl-containing compound is equal to or greater than the isocyanate equivalents of the polymeric material.

Polymeric materials according to the present should be paired with second parts having amines with a functionality that is greater than 2.0, to produce better properties, such as adhesive strength and gel content. Previous reports, for instance, teach that primary amines give a rapid cure of uretdione-containing material that limits pot life, and it has been found that that is the case with certain amines, such as diethylenetriamine and other ethylenediamine oligomers. Interestingly, it has been found that polymeric materials according to the present disclosure cure to a soft, poorly crosslinked material when cured with certain diamines. However, it has also been found that amine-terminated polyethers (e.g., available under the trade name "JEFFAMINE" commercially available from Huntsman (The Woodlands, Tex.)) produce an acceptable rate of cure, particularly when they are primary amines. Trifunctional JEFFAMINE amines, such as JEFFAMINE T403, have been found to produce particularly good performance in adhesive systems according to the present disclosure. Difunctional JEFFAMINE amines, such as JEFFAMINE D230, D400, AND THF-100, have also been found to produce good performance in adhesive systems according to the present disclosure. Extremely high molecular weight amines tend to not provide good miscibility with the polymeric material of the first part, however, and the apparent phase separation of the uretdione-containing material and the amine curing agent tends to prevent effective cure. The relatively high molecular weight of JEFFAMINE curing agents provide another advantage over small-molecule diamines: the JEFFAMINES require a weight ratio between the curing agent and the uretdione-containing material that is higher, and a balanced mixture ratio (e.g., the more closely it approaches 50 wt. % of each component) is often more convenient for two-part compositions.

The one or more amines present in the second part preferably have an average amine functionality of 2.0 or greater, 2.1 or greater, 2.2 or greater, 2.3 or greater, 2.4 or greater, 2.5 or greater, 2.6 or greater, 2.7 or greater, 2.8 or greater, 2.9 or greater, 3.0 or greater, 3.1 or greater, 3.2 or greater, 3.3 or greater, 3.4 or greater, or even 3.5 or greater; and an average amine functionality of 4.0 or less. The average amine functionality of 2.0 or greater tends to result in more desirable properties of the polymerized product after curing with the amine curing agent, such as gel content and adhesive strength. Moreover, the average amine functionality may be selected based on whether a desired application requires, e.g., stiffness versus elasticity; or high $T_g$ versus low $T_g$.

In certain embodiments, the second part includes a triamine, such as a trifunctional amine-terminated polyether. Another suitable amine for use in the second part comprises a reaction product of epichlorohydrin with 1,3-benzenedimethanamine. The at least one amine often comprises a molecular weight of 2,000 grams per mole (g/mole) or less, 1,800 g/mole or less, 1,600 g/mole or less, 1,500 g/mole or less, 1,400 g/mole or less, 1,200 g/mole or less, or even 1,000 g/mole or less.

The amount of amine included may be selected based on the amount of uretdione-containing material and optionally also epoxy material present in the first part. For instance, a number of equivalents of uretdione can be 95% or less, 90% or less, 85% or less, 80% or less, 75% or less, or 70% or less, of a number of amine equivalents; and a number of equivalents of uretdione can be 50% or more or 55% or more, than a number of amine equivalents. Similarly, a number of equivalents of uretdione and epoxy can be less than 75%, 70% or less, 65% or less, or 60% or less, of a number of amine hydrogen equivalents; and a number of equivalents of uretdione and epoxy can be greater than 45%, 50%, or 55% or more, than the number of amine hydrogen equivalents. The number of equivalents of uretdione in the polymeric material can be calculated using the method described in detail in the Examples below.

In some embodiments, the second part (and optionally the first part) further includes a catalyst selected from bismuth neodecanoate, bismuth ethylhexanoate, calcium triflate, calcium nitrate, 1,8-diazabicyclo[5.4.0]undec-7-ene, tris-(dimethylaminomethyl) phenol, and combinations thereof. One or more of these catalysts can be useful in catalyzing a reaction of components of the first part with the second part.

It has been discovered that it is possible to provide two-part compositions (according to at least certain embodiments of the present disclosure) that are 90% or greater solids and exhibit each of 1) good flowability; 2) acceptable extent of cure; and 3) curing in a relatively short amount of time. Adhesive two-part compositions can further exhibit 4) acceptable adhesion strength following curing.

The uretdione-containing material is typically kept separate from the curing agent prior to use of the polymerizable composition. That is, the uretdione-containing material is typically in a first part and the amine curing agent is typically in a second part of the polymerizable composition. The first part can include other components that do not react with the uretdione-containing material (or that react with only a portion of the uretdione-containing material). Likewise, the second part can include other components that do not react with the amine curing agent or that react with only a portion of the amine curing agent. When the first part and the second part are mixed together, the various components react to form the reaction product, for instance as shown below in the general reaction Scheme 4, in which the optional second hydroxyl group is present:

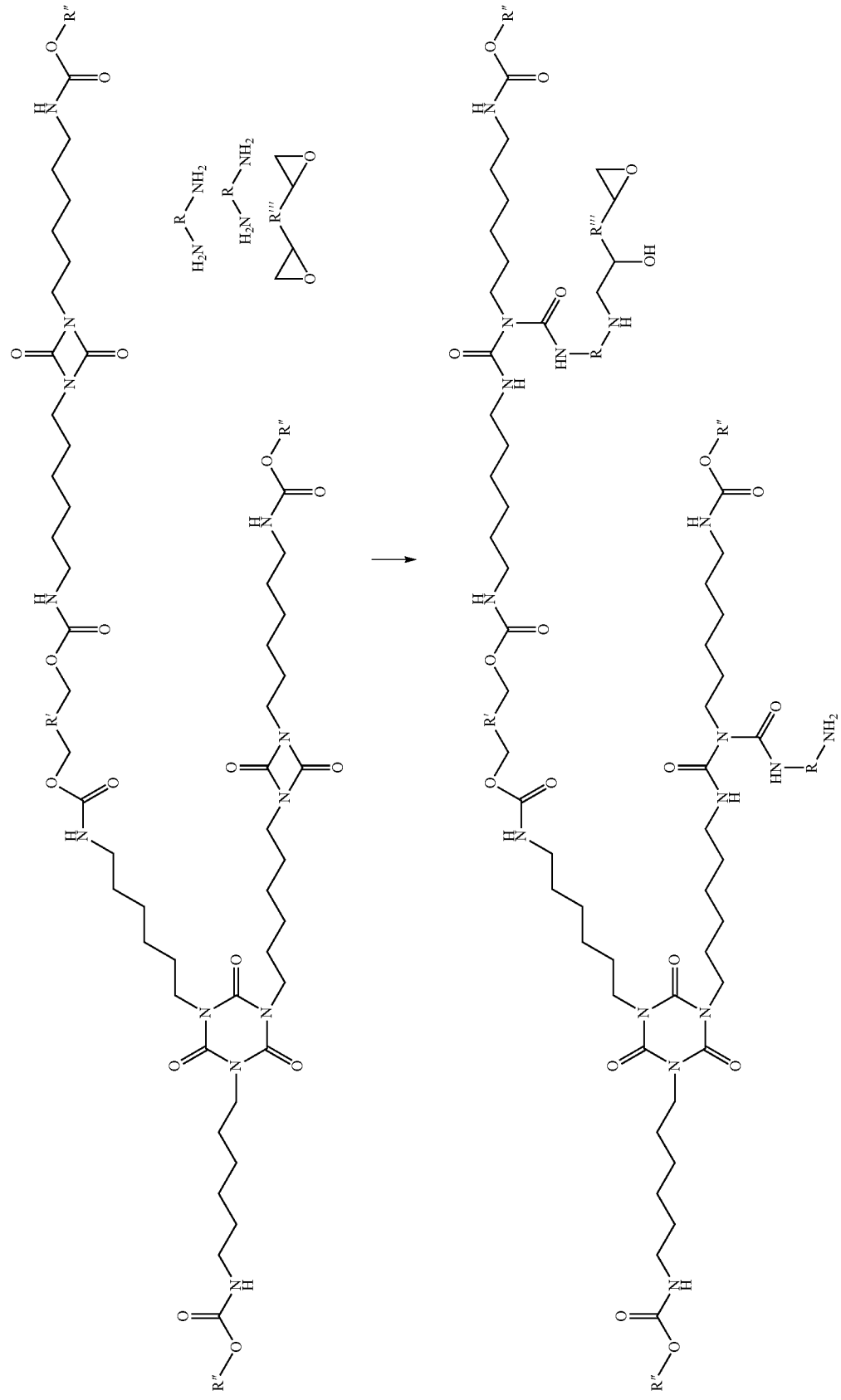
Scheme 4

In a third aspect, a polymerized product is provided. The polymerized product is the polymerized product of any of the two-part compositions according to the second aspect described above. The polymerized product typically coats at least a portion of a substrate, and up to the entire surface of a substrate depending on the application. When the polymerized product acts as an adhesive, often the polymerized product is disposed between two substrates (e.g., adhering the two substrates together). Advantageously, the polymerized product of at least some embodiments of the disclosure is suitable for use when at least one substrate comprises a moisture impermeable material, due to the high solids content of the polymerizable composition. Hence, in certain embodiments at least one substrate is made of a metal (e.g., steel), a glass, a wood, a ceramic, or a polymeric material. The polymerized product may also be employed with one or more substrates that have moisture permeability, for instance but without limitation, woven materials, nonwoven materials, paper, foams, membranes, and polymeric films.

In a fourth aspect, a method of adhering two substrates is provided. Referring to FIG. 1, the method includes obtaining a two-part composition 110; combining at least a portion of the first part with at least a portion of the second part to form a mixture 120; disposing at least a portion of the mixture on a first major surface of a first substrate 130; and contacting a first major surface of a second substrate with the mixture disposed on the first substrate 140. The two-part composition includes (i) a first part including a polymeric material and (ii) a second part including at least one amine. At least one molecule of the at least one amine has an average amine functionality of 2.0 or greater, and each amine is a primary amine or a secondary amine. The polymeric material includes a reaction product of a polymerizable composition including components. The components include (1) a uretdione-containing material including a reaction product of a diisocyanate reacted with itself; (2) a first hydroxyl-containing compound having more than one OH group; (3) an optional second hydroxyl-containing compound having a single OH group, wherein the second hydroxyl-containing compound is a primary alcohol or a secondary alcohol; and (4) an epoxy component. The polymeric material contains an average of 1.3 or greater of a uretdione functional group in a backbone of the polymeric material.

Referring again to FIG. 1, the method optionally further comprises securing the first substrate to the second substrate (e.g., with one or more mechanical clamps, under a weighted object, etc.) and allowing the mixture to cure to form an adhesive adhering the first substrate and the second substrate together 150. The method optionally further comprises allowing the mixture to cure for at least 12 hours at ambient temperature to form an adhesive adhering the first substrate and the second substrate together 160. In contrast to some other available two-part compositions that are recommended to be allowed to cure for at least 24 hours (or at least 2 days, at least 4 days, at least 7 days, or at least 2 weeks), the present disclosure provides two-part compositions that are allowed to cure for 10 hours or more, 12 hours or more, 14 hours or more, 16 hours or more, or 18 hours or more; and up to 30 hours, up to 28 hours, up to 26 hours, up to 24 hours, up to 22 hours, or up to 20 hours. In some embodiments, the mixture of the first part and the second part is allowed to cure for 10 to 22 hours or 12 to 20 hours.

Stated another way, a method of adhering two substrates together comprises:
(a) obtaining a two-part composition, the two-part composition comprising:
(i) a first part comprising:
a polymeric material comprising a reaction product of a polymerizable composition comprising components, the components comprising:
(1) a uretdione-containing material comprising a reaction product of a diisocyanate reacted with itself;
(2) a first hydroxyl-containing compound having more than one OH group;
(3) an optional second hydroxyl-containing compound having a single OH group, wherein the second hydroxyl-containing compound is a primary alcohol or a secondary alcohol; and
(4) an epoxy component;
wherein the polymeric material comprises an average of 1.3 or greater of a uretdione functional group in a backbone of the polymeric material; and
(ii) a second part comprising at least one amine, at least one molecule of the at least one amine having an average amine functionality of 2.0 or greater wherein each amine is a primary amine or a secondary amine;
(b) combining at least a portion of the first part with at least a portion of the second part to form a mixture;
(c) disposing at least a portion of the mixture on a first major surface of a first substrate; and
(d) contacting a first major surface of a second substrate with the mixture disposed on the first substrate.

Depending on the particular application, an amount of each of the first part and the second part obtained will vary; in certain embodiments, an excess of one or both of the first part and the second part is obtained and hence only a portion of one or both of the first part and the second part, respectively, will be combined to form a mixture. In other embodiments, however, a suitable amount of each of the first part and the second part for adhering the first and second substrates together is obtained and essentially all of the first part and the second part is combined to form the mixture. In certain embodiments, combining a (e.g., predetermined) amount of the first part with a (e.g., predetermined) amount of the second part is performed separately from the first and second substrates, while in other embodiments the combining is performed (e.g., directly) on the first major surface of a substrate.

The mixture is typically applied to (e.g., disposed on) the surface of the substrate using conventional techniques such as, for example, dispensing, bar coating, roll coating, curtain coating, rotogravure coating, knife coating, spray coating, spin coating, or dip coating techniques. Coating techniques such as bar coating, roll coating, and knife coating are often used to control the thickness of a layer of the mixture. In certain embodiments, the disposing comprises spreading the mixture on the first major surface of the first substrate, for instance when the mixture is dispensed (e.g., with a nozzle, etc.) on the surface of the substrate such that the mixture does not cover the entirety of a desired area.

Referring to FIG. 2, a schematic cross-section of an article 200 is illustrated. The article 200 comprises a mixture 212 (e.g., an adhesive) disposed on a first major surface 211 of a first substrate 210. The article 200 further comprises a first major surface 213 of a second substrate 214 in contact with (e.g., adhered to) the mixture 212 disposed on the first substrate 210.

Advantageously, the two-part compositions according to at least certain embodiments of the present disclosure are capable of providing at least a minimum adhesion of two substrates together. Following cure, the adhesive preferably exhibits a minimum overlap shear on aluminum of 0.3 megaPascals (MPa), 1 MPa, 5 MPa, 10 MPa, 25 MPa, or 50 MPa. A suitable test for determining the minimum overlap shear is described in the Examples below.

In a fifth aspect, a method of making a two-part composition is provided. The method includes providing a first part by forming a polymeric material including a reaction product of a polymerizable composition; and providing a second part including at least one amine. At least one molecule of the at least one amine has an average amine functionality of 2.0 or greater, and each amine is a primary amine or a secondary amine. The polymeric material includes a polymerized reaction product of a polymerizable composition including components. The components include (i) a uretdione-containing material including a reaction product of a diisocyanate reacted with itself; (ii) a first hydroxyl-containing compound having more than one OH group; (iii) an optional second hydroxyl-containing compound having a single OH group, wherein the second hydroxyl-containing compound is a primary alcohol or a secondary alcohol; and (iv) an epoxy component. The polymeric material contains an average of 1.3 or greater of a uretdione functional group in a backbone of the polymeric material.

Stated another way, a method of making a two-part composition comprises:
(a) obtaining a two-part composition, the two-part composition comprising:
  (i) a first part comprising:
    a polymeric material comprising a reaction product of a polymerizable composition comprising components, the components comprising:
    (1) a uretdione-containing material comprising a reaction product of a diisocyanate reacted with itself;
    (2) a first hydroxyl-containing compound having more than one OH group;
    (3) an optional second hydroxyl-containing compound having a single OH group, wherein the second hydroxyl-containing compound is a primary alcohol or a secondary alcohol; and
    (4) an epoxy component;
  wherein the polymeric material comprises an average of 1.3 or greater of a uretdione functional group in a backbone of the polymeric material; and
  (ii) a second part comprising at least one amine, at least one molecule of the at least one amine having an average amine functionality of 2.0 or greater wherein each amine is a primary amine or a secondary amine;
(b) combining at least a portion of the first part with at least a portion of the second part to form a mixture;
(c) disposing at least a portion of the mixture on a first major surface of a first substrate; and
(d) contacting a first major surface of a second substrate with the mixture disposed on the first substrate.

The amine of the second part is as described above with respect to the fourth aspect.

Select Embodiments of the Disclosure

Embodiment 1 is polymeric material comprising:
a polymerized reaction product of a polymerizable composition comprising components, the components comprising:
(a) a uretdione-containing material comprising a reaction product of a diisocyanate reacted with itself;
(b) a first hydroxyl-containing compound having more than one OH group;
(c) an optional second hydroxyl-containing compound having a single OH group, wherein the second hydroxyl-containing compound is a primary alcohol or a secondary alcohol; and
(d) an epoxy component;
wherein the polymeric material comprises a solids content of 90% or greater.

Embodiment 2 is the polymeric material of embodiment 1, wherein components (a), (b), and, if present, (c), are reacted, and then component (d) is combined with the reaction product of components (a), (b), and, if present, (c).

Embodiment 3 is the polymeric material of embodiment 1, wherein component (d) is present at the time of reaction of components (a), (b), and, if present, (c).

Embodiment 4 is the polymeric material of any of embodiments 1 to 3, wherein the second hydroxyl-containing compound is present and is an alkyl alcohol, a polyester alcohol, or a polyether alcohol.

Embodiment 5 is the polymeric material of any of embodiments 1 to 4, wherein the first hydroxyl-containing compound is an alkylene polyol, a polyester polyol, or a polyether polyol.

Embodiment 6 is the polymeric material of any of embodiments 1 to 5, wherein the uretdione-containing material comprises a compound of Formula I:

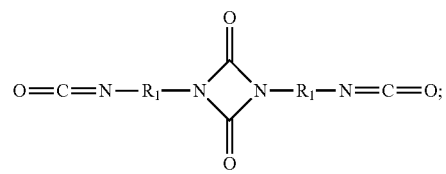

wherein $R_1$ is independently a $C_4$ to $C_{14}$ alkylene, arylene, and alkaralyene.

Embodiment 7 is the polymeric material of any of embodiments 1 to 6, wherein the second hydroxyl-containing compound is present and is of Formula VII:

$$R_{13}-OH \qquad \qquad VII;$$

wherein $R_{13}$ is selected from $R_{14}$, $R_{15}$, and a $C_1$ to $C_{50}$ alkyl;
wherein $R_{14}$ is of Formula VIII:

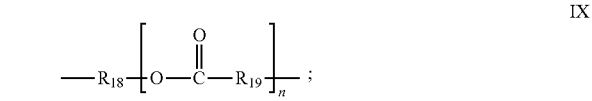

wherein m=1 to 20, $R_{16}$ is an alkyl, and $R_{17}$ is an alkylene;
wherein $R_{15}$ is of Formula IX:

$$-R_{18}\!\!\left[\!\!\begin{array}{c}O\\\|\\O-C-R_{19}\end{array}\!\!\right]_{\!n}\!\!; \qquad IX$$

wherein n=1 to 20, $R_{18}$ is an alkyl, and $R_{19}$ is an alkylene.

Embodiment 8 is the polymeric material of any of embodiments 1 to 7, wherein the first hydroxyl-containing compound is of Formula II:

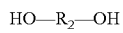

wherein $R_2$ is selected from $R_3$, an alkylene, and an alkylene substituted with an OH group, wherein $R_3$ is of Formula III or Formula IV:

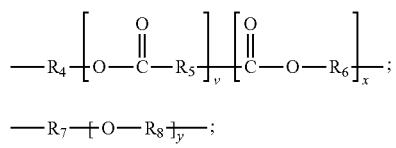

wherein each of $R_4$, $R_5$, $R_6$, $R_7$, and $R_8$ is independently an alkylene, wherein each of v and y is independently 1 to 40, and wherein x is selected from 0 to 40.

Embodiment 9 is the polymeric material of embodiment 8, wherein $R_2$ is selected from a $C_1$ to $C_{20}$ alkylene and a $C_1$ to $C_{20}$ alkylene substituted with an OH group.

Embodiment 10 is the polymeric material of embodiment 8 or embodiment 9, wherein each of $R_4$, $R_5$, $R_6$, $R_7$, and $R_8$ is independently a $C_1$ to $C_{20}$ alkylene.

Embodiment 11 is the polymeric material of any of embodiments 1 to 7, wherein the first hydroxyl-containing compound is of Formula V or Formula VI:

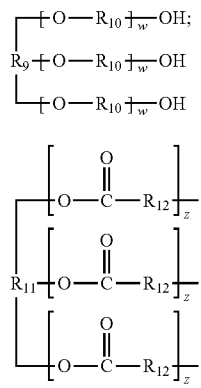

wherein each of $R_9$ and $R_{11}$ is independently an alkanetriyl, wherein each of $R_{10}$ and $R_{12}$ is independently an alkylene and wherein each of w and z is independently 1 to 20.

Embodiment 12 is the polymeric material of embodiment 11, wherein each of $R_{10}$ and $R_{12}$ is independently a $C_1$ to $C_{20}$ alkylene.

Embodiment 13 is the polymeric material of any of embodiments 1 to 12, comprising greater than one uretdione functional group in a backbone of the polymeric material.

Embodiment 14 is the polymeric material of any of embodiments 1 to 13, comprising an average of 1.3 to 6.0, inclusive, of a uretdione functional group in a backbone of the polymeric material.

Embodiment 15 is the polymeric material of any of embodiments 1 to 14, comprising an average of 1.5 to 4.0, inclusive, of a uretdione functional group in a backbone of the polymeric material.

Embodiment 16 is the polymeric material of any of embodiments 1 to 15, comprising a solids content of 94% or greater.

Embodiment 17 is the polymeric material of any of embodiments 1 to 16, comprising a solids content of 98% or greater.

Embodiment 18 is the polymeric material of any of embodiments 1 to 17, comprising an average of 0.2 to 18, inclusive, of a carbamate functional group in a backbone of the polymeric material.

Embodiment 19 is the polymeric material of any of embodiments 1 to 18, wherein the polymeric material is essentially free of isocyanates.

Embodiment 20 is the polymeric material of any of embodiments 1 to 19, wherein the diisocyanate comprises hexamethylene diisocyanate.

Embodiment 21 is the polymeric material of any of embodiments 1 to 20, further comprising a catalyst.

Embodiment 22 is the polymeric material of embodiment 19, wherein the catalyst comprises a bismuth carboxylate.

Embodiment 23 is the polymeric material of embodiment 22, wherein the bismuth carboxylate is bismuth neodecanoate.

Embodiment 24 is the polymeric material of embodiment 22, wherein the bismuth carboxylate is bismuth ethylhexanoate.

Embodiment 25 is the polymeric material of any of embodiments 1 to 24, wherein the polymeric material comprises an average of 1.3 or fewer isocyanurate units per molecule of the polymeric material.

Embodiment 26 is the polymeric material of any of embodiments 1 to 19 or 21 to 25, wherein the diisocyanate comprises a functional group selected from Formula X, Formula XI, and Formula XII:

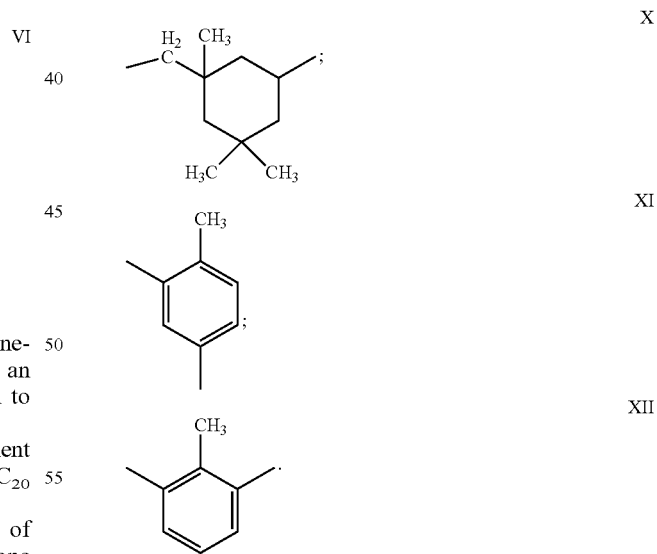

Embodiment 27 is the polymeric material of any of embodiments 1 to 26, comprising a dynamic viscosity of 10 Poise (P) to 10,000 P, inclusive, as determined using a Brookfield viscometer.

Embodiment 28 is the polymeric material of any of embodiments 1 to 27, comprising a dynamic viscosity of 10 P to 6,000 P, inclusive, or 10 P to 4,000 P, inclusive, as determined using a Brookfield viscometer.

Embodiment 29 is the polymeric material of any of embodiments 1 to 28, further comprising a plasticizer, a non-reactive diluent, or a combination thereof.

Embodiment 30 is the polymeric material of embodiment 29, wherein the non-reactive diluent is present and comprises a benzoate ester.

Embodiment 31 is the polymeric material of any of embodiments 1 to 30, wherein the epoxy component exhibits a Log water octanol partition coefficient according to the Moriguchi method of less than 27.5, less than 18, less than 10, less than 5, or less than 2.3.

Embodiment 32 is the polymeric material of any of embodiments 1 to 31, wherein the epoxy component comprises at least one monofunctional epoxy.

Embodiment 33 is the polymeric material of any of embodiments 1 to 32, wherein the epoxy component comprises at least one multifunctional epoxy.

Embodiment 34 is the polymeric material of any of embodiments 1 to 33, wherein the epoxy component comprises at least one glycidyl ether group.

Embodiment 35 is the polymeric material of any of embodiments 1 to 34, wherein the epoxy component has a molecular weight of 2,000 grams per mole or less.

Embodiment 36 is the polymeric material of any of embodiments 1 to 35, wherein the epoxy component exhibits a dynamic viscosity of 10,000 centipoises (cP) or less, 7,000 cP or less, or 3,000 cP or less, as determined using a Brookfield viscometer.

Embodiment 37 is the polymeric material of any of embodiments 1 to 36, further comprising at least one additive selected from a toughening agent, a filler, a flow control agent, an adhesion promoter, a colorant, a UV stabilizer, a flexibilizer, a fire retardant, an antistatic material, a thermally and/or electrically conductive particle, or an expanding agent.

Embodiment 38 is the polymeric material of any of embodiments 1 to 37, wherein the epoxy component comprises an aliphatic epoxy.

Embodiment 39 is the polymeric material of any of embodiments 1 to 38, wherein the epoxy component is present in an amount of 31% by weight or less, based on the total weight of the polymerizable composition.

Embodiment 40 is the polymeric material of any of embodiments 1 to 39, wherein the epoxy component is present in an amount of 25% by weight or less, 20% by weight or less or 10% by weight or less, based on the total weight of the polymerizable composition.

Embodiment 41 is the polymeric material of any of embodiments 1 to 40, wherein the second hydroxyl-containing compound is present and is selected from 2-butanol, 2-ethyl-1-hexanol, isobutanol, and 2-butyl-octanol.

Embodiment 42 is the polymeric material of any of embodiments 1 to 41, wherein the first hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 43 is the polymeric material of any of embodiments 1 to 10 or 13 to 42, wherein the second hydroxyl-containing compound is present and is of Formula II and the first hydroxyl-containing compound is of Formula V, wherein $R_9$ of the compound of Formula V is of Formula VI, and wherein $R_2$ of the compound of Formula II is a branched $C_4$ to $C_{20}$ alkyl.

Embodiment 44 is the polymeric material of any of embodiments 1 to 43, wherein a sum of the OH equivalents of the first hydroxyl-containing compound and the second hydroxyl-containing compound is equal to or greater than the isocyanate equivalents of the polymeric material.

Embodiment 45 is the polymeric material of any of embodiments 1 to 44, further comprising at least one amine, at least one molecule of the at least one amine having an average amine functionality of 2.0 or greater, wherein each amine is a primary amine or a secondary amine.

Embodiment 46 is the polymeric material of any of embodiments 1 to 45, wherein the first hydroxyl-containing compound is a diol and the reaction product comprises 0.2 to 0.65, inclusive, of diol equivalents relative to isocyanate equivalents.

Embodiment 47 is the polymeric material of any of embodiments 1 to 46, wherein the first hydroxyl-containing compound is a diol and the reaction product comprises 0.25 to 0.61, inclusive, of diol equivalents relative to isocyanate equivalents.

Embodiment 48 is the polymeric material of any of embodiments 1 to 47, wherein the first hydroxyl-containing compound comprises a branched diol.

Embodiment 49 is the polymeric material of any of embodiments 1 to 48, wherein the second hydroxyl-containing compound is present and comprises a branched alcohol.

Embodiment 50 is the polymeric material of any of embodiments 1 to 49, wherein the second hydroxyl-containing compound is present and comprises a secondary alcohol.

Embodiment 51 is the polymeric material of any of embodiments 1 to 3, 5, 6, 8 to 40, 42, or 44 to 48, comprising an average of 1.3 to 5.0, inclusive, of a uretdione functional group in a backbone of the polymeric material and wherein the polymerizable composition is free of the second hydroxyl-containing compound.

Embodiment 52 is a two-part composition comprising:
(a) a first part comprising a polymeric material comprising:
  a polymerized reaction product of a polymerizable composition comprising components, the components comprising:
  (i) a uretdione-containing material comprising a reaction product of a diisocyanate reacted with itself;
  (ii) a first hydroxyl-containing compound having more than one OH group;
  (iii) an optional second hydroxyl-containing compound having a single OH group, wherein the second hydroxyl-containing compound is a primary alcohol or a secondary alcohol;
  and
  (iv) an epoxy component;
  wherein the polymeric material comprises an average of 1.3 or greater of a uretdione functional group in a backbone of the polymeric material; and
(b) a second part comprising at least one amine, at least one molecule of the at least one amine having an average amine functionality of 2.0 or greater, wherein each amine is a primary amine or a secondary amine.

Embodiment 53 is the two-part composition of embodiment 52, wherein at least one molecule of the at least one amine has an average amine functionality of 3.0 or greater.

Embodiment 54 is the two-part composition of embodiment 52 or embodiment 53, wherein the at least one amine has an average amine functionality of 2.4 or greater.

Embodiment 55 is the two-part composition of any of embodiments 52 to 54, wherein the at least one amine comprises a triamine.

Embodiment 56 is the two-part composition of any of embodiments 52 to 55, wherein the at least one amine comprises an amine-terminated polyether.

Embodiment 57 is the two-part composition of any of embodiments 52 to 56, wherein the at least one amine comprises a difunctional or trifunctional amine-terminated polyether.

Embodiment 58 is the two-part composition of any of embodiments 52 to 57, wherein the at least one amine comprises a trifunctional amine-terminated polyether.

Embodiment 59 is the two-part composition of any of embodiments 52 to 58, wherein the at least one amine comprises a reaction product of epichlorohydrin with 1,3-benzenedimethanamine.

Embodiment 60 is the two-part composition of any of embodiments 52 to 59, wherein the at least one amine comprises a molecular weight of 2,000 grams per mole or less.

Embodiment 61 is the two-part composition of any of embodiments 52 to 60, wherein components (i), (ii), and, if present, (iii), are reacted, and then component (iv) is combined with the reaction product of components (i), (ii), and, if present, (iii).

Embodiment 62 is the two-part composition of any of embodiments 52 to 60, wherein component (iv) is present at the time of reaction of components (i), (ii), and, if present, (iii).

Embodiment 63 is the two-part composition of any of embodiments 52 to 62, wherein the second hydroxyl-containing compound is present and is an alkyl alcohol, a polyester alcohol, or a polyether alcohol.

Embodiment 64 is the two-part composition of any of embodiments 52 to 63, wherein the first hydroxyl-containing compound is an alkylene polyol, a polyester polyol, or a polyether polyol.

Embodiment 65 is the two-part composition of any of embodiments 52 to 64, wherein the uretdione-containing material comprises a compound of Formula I:

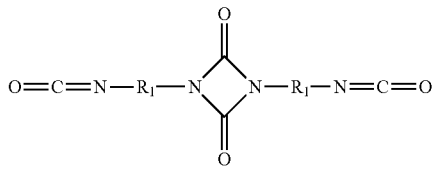

I wherein $R_1$ is independently selected from a $C_4$ to $C_{14}$ alkylene, arylene, and alkaralyene.

Embodiment 66 is the two-part composition of any of embodiments 52 to 65, wherein the second hydroxyl-containing compound is present and is of Formula VII:

$R_{13}$—OH    VII;

wherein $R_{13}$ is selected from $R_{14}$, $R_{15}$, and a $C_1$ to $C_{50}$ alkyl;

wherein $R_{14}$ is of Formula VIII:

VIII wherein m=1 to 20, $R_{16}$ is an alkyl, and $R_{17}$ is an alkylene;
wherein $R_{15}$ is of Formula IX:

IX wherein n=1 to 20, $R_{18}$ is an alkyl, and $R_{19}$ is an alkylene.

Embodiment 67 is the two-part composition of any of embodiments 52 to 66, wherein the first hydroxyl-containing compound is of Formula II:

HO—$R_2$—OH    II;

wherein $R_2$ is selected from $R_3$, an alkylene, and an alkylene substituted with an OH group, wherein $R_3$ is of Formula III or Formula IV:

III

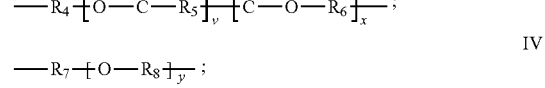

IV wherein each of $R_4$, $R_5$, $R_6$, $R_7$, and $R_8$ is independently an alkylene, wherein each of v and y is independently 1 to 40, and wherein x is selected from 0 to 40.

Embodiment 68 is the two-part composition of embodiment 67, wherein $R_2$ is selected from a $C_1$ to $C_{20}$ alkylene and a $C_1$ to $C_{20}$ alkylene substituted with an OH group.

Embodiment 69 is the two-part composition of embodiment 67 or embodiment 68, wherein each of $R_4$, $R_5$, $R_6$, $R_7$, and $R_8$ is independently a $C_1$ to $C_{20}$ alkylene.

Embodiment 70 is the polymeric material of any of embodiments 52 to 69, wherein the first hydroxyl-containing compound is of Formula V or Formula VI:

V

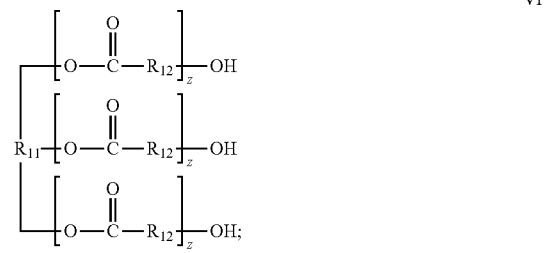

VI wherein each of $R_9$ and $R_{11}$ is independently an alkanetriyl, wherein each of $R_{10}$ and $R_{12}$ is independently an alkylene and wherein each of w and z is independently 1 to 20.

Embodiment 71 is the two-part composition of embodiment 70, wherein each of $R_{10}$ and $R_{12}$ is independently a $C_1$ to $C_{20}$ alkylene.

Embodiment 72 is the two-part composition of any of embodiments 52 to 71, comprising greater than one uretdione functional group in a backbone of the polymeric material.

Embodiment 73 is the two-part composition of any of embodiments 52 to 72, comprising an average of 1.3 to 6.0, inclusive, of a uretdione functional group in a backbone of the polymeric material.

Embodiment 74 is the two-part composition of any of embodiments 52 to 73, comprising an average of 1.5 to 4.0, inclusive, of a uretdione functional group in a backbone of the polymeric material.

Embodiment 75 is the two-part composition of any of embodiments 52 to 74, comprising a solids content of 90% or greater.

Embodiment 76 is the two-part composition of any of embodiments 52 to 75, comprising a solids content of 98% or greater.

Embodiment 77 is the two-part composition of any of embodiments 52 to 76, comprising an average of 0.2 to 18, inclusive, of a carbamate functional group in a backbone of the polymeric material.

Embodiment 78 is the two-part composition of any of embodiments 52 to 77, wherein the polymeric material is essentially free of isocyanates.

Embodiment 79 is the two-part composition of any of embodiments 52 to 78, wherein the diisocyanate comprises hexamethylene diisocyanate.

Embodiment 80 is the two-part composition of any of embodiments 52 to 79, further comprising a catalyst.

Embodiment 81 is the two-part composition of embodiment 80, wherein the catalyst comprises a bismuth carboxylate.

Embodiment 82 is the two-part composition of embodiment 81, wherein the catalyst is selected from the group consisting of bismuth neodecanoate, bismuth ethylhexanoate, calcium triflate, calcium nitrate, 1,8-diazabicyclo[5.4.0]undec-7-ene, tris-(dimethylaminomethyl) phenol, and combinations thereof.

Embodiment 83 is the two-part composition of embodiment 81, wherein the bismuth carboxylate comprises bismuth neodecanoate.

Embodiment 84 is the two-part composition of embodiment 81, wherein the bismuth carboxylate comprises bismuth ethylhexanoate.

Embodiment 85 is the two-part composition of any of embodiments 52 to 84, wherein the polymeric material comprises an average of 1.3 or fewer isocyanurate units per molecule of the polymeric material.

Embodiment 86 is the two-part composition of any of embodiments 52 to 78 or 80 to 85, wherein the diisocyanate comprises a functional group selected from Formula X, Formula XI, and Formula XII:

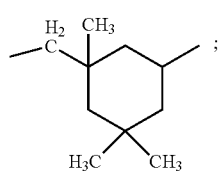

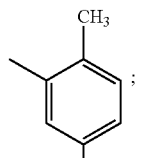

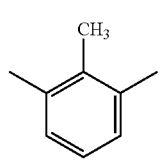

Embodiment 87 is the two-part composition of any of claims 52 to 86, wherein the first part comprises a dynamic viscosity of 10 Poise (P) to 10,000 P, inclusive, as determined using a Brookfield viscometer.

Embodiment 88 is the two-part composition of any of embodiments 52 to 87, wherein the first part comprises a dynamic viscosity of 10 P to 6,000 P, inclusive, or 10 P to 4,000 P, as determined using a Brookfield viscometer.

Embodiment 89 is the two-part composition of any of embodiments 52 to 88, wherein the first part further comprises a plasticizer, a non-reactive diluent, or a combination thereof.

Embodiment 90 is the two-part composition of embodiment 89, wherein the non-reactive diluent is present and comprises a benzoate ester.

Embodiment 91 is the two-part composition of any of embodiments 52 to 90, wherein the epoxy component exhibits a Log water octanol partition coefficient according to the Moriguchi method of less than 27.5, less than 18, less than 10, less than 5, or less than 2.3.

Embodiment 92 is the two-part composition of any of embodiments 52 to 91, wherein the epoxy component comprises at least one monofunctional epoxy.

Embodiment 93 is the two-part composition of any of embodiments 52 to 92, wherein the epoxy component comprises at least one multifunctional epoxy.

Embodiment 94 is the two-part composition of any of embodiments 52 to 93, wherein the epoxy component comprises at least one glycidyl ether group.

Embodiment 95 is the two-part composition of any of embodiments 52 to 94, wherein the epoxy component has a molecular weight of 2,000 grams per mole or less.

Embodiment 96 is the two-part composition of any of embodiments 52 to 95, wherein the epoxy component exhibits a dynamic viscosity of 10,000 centipoises (cP) or less, 7,000 cP or less, or 3,000 cP or less, as determined using a Brookfield viscometer.

Embodiment 97 is the two-part composition of any of embodiments 52 to 96, further comprising at least one additive selected from a toughening agent, a filler, a flow control agent, an adhesion promoter, a colorant, a UV stabilizer, a flexibilizer, a fire retardant, an antistatic material, a thermally and/or electrically conductive particle, or an expanding agent.

Embodiment 98 is the two-part composition of any of embodiments 52 to 97, wherein the epoxy component comprises an aliphatic epoxy.

Embodiment 99 is the two-part composition of any of embodiments 52 to 98, wherein the epoxy component comprises at least one monofunctional epoxy.

Embodiment 100 is the two-part composition of any of embodiments 52 to 99, wherein the epoxy component comprises at least one multifunctional epoxy.

Embodiment 101 is the two-part composition of any of embodiments 52 to 100, wherein the epoxy component comprises at least one glycidyl ether group.

Embodiment 102 is the two-part composition of any of embodiments 52 to 101, wherein the epoxy component has a molecular weight of 2,000 grams per mole or less.

Embodiment 103 is the two-part composition of any of embodiments 52 to 102, wherein the epoxy component is present in an amount of 31% by weight or less, 25% by weight or less, 20% by weight or less, or 10% by weight or less, based on the total weight of the polymerizable composition.

Embodiment 104 is the two-part composition of any of embodiments 52 to 103, wherein the second hydroxyl-containing compound is present and is selected from 2-butanol, 2-ethyl-1-hexanol, isobutanol, and 2-butyl-octanol.

Embodiment 105 is the two-part composition of any of embodiments 52 to 104, wherein the first hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 106 is the two-part composition of any of embodiments 52 to 105 or 67 to 94, wherein the second hydroxyl-containing compound is present and is of Formula I and the first hydroxyl-containing compound is of Formula V, wherein $R_9$ of the compound of Formula V is of Formula VI, and wherein $R_2$ of the compound of Formula II is a branched $C_4$ to $C_{20}$ alkyl.

Embodiment 107 is the two-part composition of any of embodiments 52 to 106, wherein a sum of the OH equivalents of the first hydroxyl-containing compound and the second hydroxyl-containing compound is equal to or greater than the isocyanate equivalents of the polymeric material.

Embodiment 108 is the two-part composition of any of embodiments 52 to 107, wherein the first hydroxyl-containing compound is a diol.

Embodiment 109 is the two-part composition of any of embodiments 52 to 108, wherein the first hydroxyl-containing compound is a diol and the reaction product comprises 0.2 to 0.65, inclusive, of diol equivalents relative to isocyanate equivalents.

Embodiment 110 is the two-part composition of any of embodiments 52 to 109, wherein the first hydroxyl-containing compound is a diol and the reaction product comprises 0.25 to 0.61, inclusive, of diol equivalents relative to isocyanate equivalents.

Embodiment 111 is the two-part composition of any of embodiments 52 to 110, wherein the second hydroxyl-containing compound is present and comprises a branched alcohol.

Embodiment 112 is the two-part composition of any of embodiments 52 to 111, wherein the second hydroxyl-containing compound is present and comprises a secondary alcohol.

Embodiment 113 is the two-part composition of any of embodiments 52 to 112, wherein the first hydroxyl-containing compound comprises a branched diol.

Embodiment 114 is the two-part composition of any of embodiments 52 to 113, wherein the first part comprises a solids content of 90% or greater.

Embodiment 115 is the two-part composition of any of embodiments 52 to 114, wherein the first part comprises a solids content of 98% or greater.

Embodiment 116 is the two-part composition of any of embodiments 52 to 115, wherein the second part comprises a solids content of 90% or greater.

Embodiment 117 is the two-part composition of any of embodiments 52 to 116, wherein the second part comprises a solids content of 98% or greater.

Embodiment 118 is the two-part composition of any of embodiments 52 to 117, wherein the second part comprises a viscosity of 0.1 Poise (P) to 5,000 P, inclusive, as determined using a Brookfield viscometer.

Embodiment 119 is the two-part composition of any of embodiments 52 to 118, wherein the second part comprises a viscosity of 0.1 Poise (P) to 1,000 P, inclusive, as determined using a Brookfield viscometer.

Embodiment 120 is the two-part composition of any of embodiments 52 to 62, 64 to 69, 71 to 103, 105, 107 to 110, or 113 to 119, comprising an average of 1.3 to 5.0, inclusive, of a uretdione functional group in a backbone of the polymeric material and wherein the polymerizable composition is free of the second hydroxyl-containing compound.

Embodiment 121 is a two-part composition of any of embodiments 52 to 120 where a number of equivalents of uretdione is less than 100% of a number of amine equivalents.

Embodiment 122 is a two-part composition of any of embodiments 52 to 121 where a number of equivalents of uretdione is 90% or less, 80% or less, or 70% or less, of a number of amine equivalents.

Embodiment 123 is a two-part composition of any of embodiments 52 to 122 where a number of equivalents of uretdione is more than 50% of a number of amine equivalents.

Embodiment 124 is a two-part composition of any of embodiments 52 to 123 where a number of equivalents of uretdione and epoxy is less than 75% of a number of amine hydrogen equivalents.

Embodiment 125 is a two-part composition of any of embodiments 52 to 124 where a number of equivalents of uretdione and epoxy is 60% or less of a number of amine hydrogen equivalents.

Embodiment 126 is a two-part composition of any of embodiments 52 to 125 where the number of equivalents of uretdione and epoxy is greater than 45% of the number of amine hydrogen equivalents.

Embodiment 127 is a polymerized product of the two-part composition of any of embodiments 52 to 126.

Embodiment 128 is the polymerized product of embodiment 127, wherein the polymerized product coats at least a portion of a substrate.

Embodiment 129 is the polymerized product of embodiment 127 or embodiment 128, wherein the polymerized product is disposed between two substrates.

Embodiment 130 is the polymerized product of embodiment 128 or embodiment 129, wherein at least one substrate comprises a moisture impermeable material.

Embodiment 131 is the polymerized product of any of embodiments 127 to 130, wherein at least one substrate is made of a metal.

Embodiment 132 is a method of adhering two substrates together, the method comprising:
  (a) obtaining a two-part composition, the two-part composition comprising:
    (i) a first part comprising:
      a polymeric material comprising a reaction product of a polymerizable composition comprising components, the components comprising:

(1) a uretdione-containing material comprising a reaction product of a diisocyanate reacted with itself;
(2) a first hydroxyl-containing compound having more than one OH group;
(3) an optional second hydroxyl-containing compound having a single OH group, wherein the second hydroxyl-containing compound is a primary alcohol or a secondary alcohol; and
(4) an epoxy component;
wherein the polymeric material comprises an average of 1.3 or greater of a uretdione functional group in a backbone of the polymeric material; and
(ii) a second part comprising at least one amine, at least one molecule of the at least one amine having an average amine functionality of 2.0 or greater wherein each amine is a primary amine or a secondary amine;
(b) combining at least a portion of the first part with at least a portion of the second part to form a mixture;
(c) disposing at least a portion of the mixture on a first major surface of a first substrate; and
(d) contacting a first major surface of a second substrate with the mixture disposed on the first substrate.

Embodiment 133 is the method of embodiment 132, further comprising securing the first substrate to the second substrate and allowing the mixture to cure to form an adhesive adhering the first substrate and the second substrate together.

Embodiment 134 is the method of embodiment 132 or embodiment 133, further comprising allowing the mixture to cure for at least 12 hours at ambient temperature to form an adhesive adhering the first substrate and the second substrate together.

Embodiment 135 is the method of embodiment 133 or embodiment 134, wherein the adhesive exhibits a minimum overlap shear on aluminum of 0.3 megaPascals (MPa).

Embodiment 136 is the method of any of embodiments 132 to 135, where the combining is performed on the first major surface of the first substrate.

Embodiment 137 is the method of any of embodiments 132 to 136, wherein the disposing comprises spreading the mixture on the first major surface of the first substrate.

Embodiment 138 is a method of making a two-part composition, the method comprising:
(a) providing a first part by forming a polymeric material of any of embodiments 1 to 51; and
(b) providing a second part comprising at least one amine, at least one molecule of the at least one amine having an average amine functionality of 2.0 or greater, wherein each amine is a primary amine or a secondary amine.

Embodiment 139 is the method of embodiment 138, wherein at least one molecule of the at least one amine has an average amine functionality of 3.0 or greater.

Embodiment 140 is the method of embodiment 138 or embodiment 139, wherein the at least one amine has an average amine functionality of 2.4 or greater.

Embodiment 141 is the method of any embodiments 138 to 140, wherein the at least one amine comprises a triamine.

Embodiment 142 is the method of any of embodiments 138 to 141, wherein the at least one amine comprises an amine-terminated polyether.

Embodiment 143 is the method of any of embodiments 138 to 142, wherein the at least one amine comprises a difunctional or trifunctional amine-terminated polyether.

Embodiment 144 is the method of any of embodiments 138 to 143, wherein the at least one amine comprises a trifunctional amine-terminated polyether.

Embodiment 145 is the method of any of embodiments 138 to 144, wherein the at least one amine comprises a reaction product of epichlorohydrin with 1,3-benzenedimethanamine.

Embodiment 146 is the method of any of embodiments 138 to 145, wherein the at least one amine comprises a molecular weight of 2,000 grams per mole or less.

EXAMPLES

Unless otherwise noted or readily apparent from the context, all parts, percentages, ratios, etc. in the Examples and the rest of the specification are by weight. Table 1, below, lists materials used in the examples and their sources.

TABLE 1

Materials List

| DESIGNATION | DESCRIPTION | SOURCE |
| --- | --- | --- |
| DN3400 | HDI-based oligomer with uretdione functional groups obtained under the trade designation "DESMODUR N3400" | Covestro, Leverkusen, Germany |
| 2-ethyl hexanol | 2-ethylhexanol | Alfa Aesar, Haverhill, Massachusetts |
| 2-butanol | 2-butanol | Alfa Aesar |
| 1,3-BD | 1,3-butanediol | Alfa Aesar |
| 2,2-dimethyl-1,3-propanediol | | Alfa Aesar |
| BiND | bismuth neodecanoate | Gelest, Morrisville, Pennsylvania |
| T1000 | Poly(tetramethylene ether) glycol with a molecular weight of 1000 g/mol obtained under the trade designation "TERATHANE 1000" | Invista; Wichita, Kansas |
| T650 | Poly(tetramethylene ether) glycol with a molecular weight of 650 g/mol obtained under the trade designation "TERATHANE 650" | Invista |
| THF blend | 1:1 molar ratio blend of T1000 and T650 | |
| CL1000 | Aliphatic secondary diamine curative obtained under the trade designation "CLEARLINK 1000" | Dorf Ketal Chemicals LLC Houston, Texas |

TABLE 1-continued

Materials List

| DESIGNATION | DESCRIPTION | SOURCE |
|---|---|---|
| DBU | 1,8-Diazabicyclo[5.4.0]undec-7-ene | Alfa Aesar |
| AK54 | 2,4,6-tris-(dimethylaminomethyl)phenol | TCI America, Portland, Oregon |
| H107 | Cyclohexanedimethanol diglycidyl ether obtained under the trade designation "HELOXY 107" | Hexion Inc., Columbus, Ohio |
| EGS110 | Glycidyl ester of neodecanoic acid obtained under the trade designation "ERISYS GS-110" | Emerald Performance Materials, Vancouver, Washington |
| EGE6 | 2-Ethylhexyl glycidyl ether obtained under the trade designation "ERISYS GE-6" | Emerald Performance Materials |
| EGE21 | 1,4-butanediol diglycidyl ether obtained under the trade designation "ERISYS GE-21" | Emerald Performance Materials |
| EGE20 | Neopentyl glycol diglycidyl ether obtained under the trade designation "ERISYS GE-20" | Emerald Performance Materials |
| H48 | Trimethylolpropane triglycidyl ether obtained under the trade designation HELOXY 48 | Hexion Inc. |
| H505 | Castor oil polyglycidyl ether obtained under the trade designation "HELOXY 505" | Hexion Inc. |
| EGE31 | Triglycidyl ether of trimethylolethane obtained under the trade designation "ERISYS GE-31" | Emerald Performance Materials |
| EGE35H | Special grade of the triglycidyl ether of castor oil obtained under the trade designation "ERISYS GE-35H" | Emerald Performance Materials |
| EGA240 | Tetrafunctional epoxy resin based on meta-Xylylenediamine obtained under the trade designation "ERISYS GA-240" | Emerald Performance Materials |
| ELV5 | Chemically inert, low viscosity liquid hydrocarbon resin obtained under the trade designation "EPODIL LV5" | Evonik Industries, Essen, Germany |
| JT403 | Trifunctional amine-terminated polyether obtained under the trade designation "JEFFAMINE T-403 Polyetheramine" | Huntsman Corporation, The Woodlands, Texas |
| JD400 | Difunctional amine-terminated polyether obtained under the trade designation "JEFFAMINE D400" | Huntsman Corporation |
| JT3000 | Trifunctional amine-terminated polyether obtained under the trade designation "JEFFAMINE T-3000" | Huntsman Corporation |
| JTHF100 | Difunctional amine-terminated polyether obtained under the trade designation "JEFFAMINE THF-100 Polyetheramine" | Huntsman Corporation |
| JD230 | Difunctional amine-terminated polyether obtained under the trade designation "JEFFAMINE D230" | Huntsman Corporation |
| IPDA | Isophorone diamine | Sigma-Aldrich, St. Louis, Missouri |
| G328 | 1,3-benzenedimethanamine; reaction products with epichlorohydrin, obtained under the trade designation "GASKAMINE 328" | Mitsubishi Gas Chemical Company, New York, New York |
| G240 | Reaction product between MXDA and styrene; obtained under the trade designation "GASKAMINE 240" | Mitsubishi Gas Chemical Company |
| C5607 | Solvent-free phenalkamine obtained under the trade designation "CARDOLITE 5607" | Cardolite Corporation, New Jersey |
| TTD | 4,7,10-Trioxatridecane-1,13-diamine | Sigma-Aldrich |
| JMB10 | Non-reactive diluent, monoester of benzoic acid and isodecyl alcohol obtained under the trade designation "JAYFLEX MB10" | ExxonMobil Chemical, Houston, Texas |
| B9-88 | Non-reactive diluent, high solvating benzoate ester obtained under the trade designation "BENZOFLEX 9-88" | Eastman Chemical Company, Kingsport, Tennessee |

TABLE 1-continued

Materials List

| DESIGNATION | DESCRIPTION | SOURCE |
| --- | --- | --- |
| FR44-111 | Poly(butylene adipate) diol obtained under the trade designation FOMREZ 44-111" | Lanxess, Cologne, Germany |
| A350a | Standard reactive liquid polyamide possessing low viscosity and high imidazoline content obtained under the trade designation "ANCAMIDE 350A" | Evonik Industries |
| EPON 828 | BPA Epoxy solution obtained under the trade designation "EPON 828" | Hexion Inc. |
| Epoxy-Mix | Epoxy mixture of equal weight percent of EGE31, EGE6, EGE21, EGS110, EPON 828, and H505 | |
| Calcium Triflate | Calcium trifluoromethanesulfonate | 3M Company, St Paul, Minnesota |
| Calcium Nitrate | Calcium nitrate tetrahydrate ACS | VWR Chemicals LLC, Radnor, Pennsylvania |

Test Methods

Method for Determining Log P:

Log water octanol partition coefficient was calculated by the Moriguchi method implemented in the software program Molecular Modeling Pro Plus, Version 6.2.6, Norgwyn Montgomery Software Inc. (North Wales, Pa., USA).

Overlap Shear Test Method:

The performance of adhesives derived from uretdione-containing polymeric materials was determined using overlap shear tests. Aluminum coupons (25 mm×102 mm×1.6 mm) were sanded with 220 grit sandpaper, wiped with isopropanol, and dried. The polymeric material (containing uretdione functional groups) and the epoxy component were each added to a plastic cup and mixed for 45 seconds to 90 seconds using a speed mixer (DAC 150 FV from Flack-tek, Landrun, S.C.). Amine curative and catalyst (if used) were then added to the plastic cup, and the mixture was mixed for 15 to 30 seconds using a combination of hand mixing with a wood applicator stick and the speed mixer. The mixture was then applied to a 25 mm×13 mm area on one end of the aluminum coupon, and two pieces of stainless steel wire (0.25 mm diameter) were placed in the resin to act as bondline spacers. One end of a second aluminum coupon was then pressed into to the mixture to produce an overlap of approximately 13 mm. A binder clip was placed on the sample, and it was allowed to cure for at least 18 hours. The samples were tested to failure in shear mode at a rate of 2.54 mm/minute using a tensile load frame with self-tightening grips (from MTS Systems, Eden Prairie, Minn., or from Instron Corporation, Norwood, Mass.). After failure, the length of the overlap area was measured. The overlap shear value was then calculated by dividing the peak load by the overlap area. Overlap shear test results are summarized in Tables 3, 4, and 5, below, for the various formulations tested.

FTIR Characterization:

The infrared (IR) spectra of the uretdione-containing polymeric material samples and the cured two-part compositions (e.g., coatings/adhesives) were obtained using an infrared Fourier Transform spectrometer (NICOLET 6700 FT-IR Spectrometer, Thermo Scientific, Madison, Wis.) equipped with a Smart iTR Diamond Attenuated Total Reflectance (ATR) accessory. For all the uretdione-containing polymeric materials, the isocyanate peak at 2260 $cm^{-1}$ was not present in the infrared spectrum, indicating that the isocyanate had reacted completely with the alcohols during the preparation of the polymeric materials. For all the polymeric materials, a strong uretdione signal at 1760 $cm^{-1}$ was observed. For all the cured two-part compositions, the uretdione signal at 1760 $cm^{-1}$ had nearly disappeared, indicating reaction of the uretdione group during the cure of the two-part compositions.

Brookfield Viscosity Measurement of Uretdione-Containing Polymeric Materials:

The viscosity of the uretdione-containing polymeric materials was measured with a model LVDVII+ Viscometer (Brookfield Eng Labs Inc., Stoughton, Mass.) using a LV4 spindle at about 24° C. Samples with viscosities below 6000 poise (P) were measured at 0.6 revolutions per minute (RPM), and samples with viscosities above 6000 P were measured at 0.3 RPM. Samples that were too stiff for the spindle to penetrate the material are listed as solids, while samples that were penetrated by the spindle but were too stiff to measure are listed at a viscosity greater than 11,000 P.

NMR Analysis of DN3400:

DN3400 was dissolved in deuterated dimethyl sulfoxide (DMSO) solvent. The 1H proton spectrum was taken with a 500 MHz NMR (AVANCE III 500 MHz spectrometer equipped with a broadband cryoprobe from Bruker, Billerica, Mass.). The resulting spectrum had 5 major signals. Signals at 1.31 parts per million (ppm) and 1.55 ppm were attributed to methylene groups at the 3 and 4 positions and the 2 and 5 positions of the HDI derivatives, respectively. A signal at 3.17 ppm was attributed to methylene protons adjacent to a uretdione group. A signal at 3.34 ppm was attributed to methylene protons adjacent to an isocyanate group. A signal at 3.74 ppm was attributed to methylene protons adjacent to an isocyanurate group. The integrations of these three methylene signals were 1.35, 1.79, and 0.49, respectively. The published values for DN3400 are an equivalent weight of isocyanate of 193 grams/equivalent and 22 weight percent (wt. %) isocyanate. The ratio of the integration of the signal at 3.17 ppm over the integration of the signal at 3.34 ppm is 0.75, which corresponds to 16 wt. % uretdione. The ratio of the integration of the signal at 3.74 ppm over the integration of the signal at 3.34 ppm is 0.27, which corresponds to 3 wt. % isocyanurate. The functionality of DN3400 is published as 2.5 (in "Raw Materials for Automotive Refinish Systems" from Bayer Materials Science, 2005), so the average molecular weight of the molecule in DN3400 is 193 grams/equivalent×2.5 equivalents/ mole=482 grams/mol. For every 2.5 methylene groups adjacent to isocyanate, there are 0.75*2.5=1.875 methylene groups adjacent to uretdione. There are two methylene groups adjacent to each uretdione group, so there are about 1.875/2=0.94 uretdione groups per molecule of DN3400. Similarly, for every 2.5 methylene groups adjacent to isocyanate, there are 0.27*2.5=0.68 methylene groups adjacent to isocyanurate. There are three methylene groups adjacent to each isocyanurate group, so there are about 0.68/3=0.23 isocyanurate groups per molecule of DN3400.

Calculation of Uretdione and Isocyanurate Functionality in Uretdione-Containing Polymeric Materials:

A modified Carothers equation relates degree of polymerization (DP) to the average functionality (fav) and conversion (p) in a step growth polymerization [Carothers, Wallace (1936). "Polymers and Polyfunctionality". Transaction of the Faraday Society. 32: 39-49].

$$DP=2/(2-pf_{av})$$

This equation can be used to calculate the average degree of polymerization of each uretdione-containing polymeric material. Based on the degree of polymerization, the average number of uretdione groups in the polymeric material (fUD) can be calculated by $$f(UD)=DP \times (DN3400 \text{ molecules})*(\text{uretdione groups per } DN3400 \text{ molecule})/(\text{total molecules})$$

where the values for "DN3400 molecules" and the "total molecules" correspond to the respective moles of molecules used to make the polymeric material, and the value for "uretdione groups per DN3400 molecule" is 0.94, as calculated based on the NMR data (above). We show below that polymeric materials with an average uretdione functionality between 1.2<(fUD)<5 in combination with a diluent produce reasonably good properties when cured.

Similarly, the average number of isocyanurate groups in the uretdione-containing polymeric material (fICRT) can be calculated by $$f(ICRT)=DP \times (DN3400 \text{ molecules})*(\text{isocyanurate groups per } DN3400 \text{ molecule})/(\text{total molecules})$$

where the value for "isocyanurate groups per DN3400 molecule" is 0.23, as calculated based on the NMR data (above).

General Polymeric Material Preparation:

Bismuth neodecanoate, DN3400, the chain extender, the capping group, and epoxy (when applicable) were added to a glass jar according to Tables 2, 3, 4 and 5. The amounts of alcohol that were added correspond to the equivalent values in Tables 2, 3, 4 and 5 (relative to the equivalents of isocyanate). The mixture was stirred magnetically at 700 revolutions per minute (RPM). Initially the mixture was hazy, and after about one minute, the mixture became clear and slightly warm. The mixture then continued to exotherm noticeably. Stirring was continued for a total of 5 minutes, and the polymeric material was then allowed to cool to room temperature.

TABLE 2

Polymeric Material Formulations

| Sample | Capping Group | | | Chain Extender | | | DN3400 g | BiND g | Calculated Uretdione Functionality, fUD |
|---|---|---|---|---|---|---|---|---|---|
| | Type | g | Relative equiv. | Type | g | Relative equiv. | | | |
| EX-1A | 2-Butanol | 0.90 | 0.63 | 2,2-dimethyl-1,3-propanediol | 0.37 | 0.37 | 3.72 | 0.01 | 1.74 |
| EX-1B | 2-Butanol | 21.28 | 0.75 | 2,2-dimethyl-1,3-propanediol | 4.98 | 0.25 | 73.88 | 0.20 | 1.37 |
| EX-1C | 2-Ethyl Hexanol | 4.02 | 1.00 | n/a | n/a | 0 | 5.95 | 0.02 | 0.94 |
| EX-1D | 2-Butanol | 22.35 | 0.64 | T1000 | 85.97 | 0.36 | 91.39 | 1.00 | 1.74 |
| EX-1E | 2-Butanol | 25.96 | 0.63 | T650 | 66.56 | 0.37 | 107.14 | 1.00 | 1.74 |
| EX-1F | 2-Butanol | 12.50 | 0.59 | FR44-111 | 41.30 | 0.41 | 55.40 | 0.15 | 1.94 |
| EX-1G | 2-Butanol | 13.85 | 0.65 | FR44-111 | 35.00 | 0.35 | 55.40 | 0.15 | 1.67 |
| EX-1H | 2-Butanol | 9.59 | 0.45 | 2,2-dimethyl-1,3-propanediol | 8.21 | 0.55 | 55.40 | 0.15 | 3.0 |
| EX-1I | 2-Butanol | 14.17 | 0.49 | 2,2-dimethyl-1,3-propanediol | 10.35 | 0.50 | 75.27 | 0.20 | 2.59 |
| EX-1J | 2-Butanol | 7.54 | 0.42 | 2,2-dimethyl-1,3-propanediol | 45.61 | 0.58 | 46.72 | 0.13 | 3.41 |
| EX-1K | 2-Butanol | 4.52 | 0.39 | 2,2-dimethyl-1,3-propanediol | 5.02 | 0.61 | 30.38 | 0.082 | 4.0 |
| EX-1L | 2-Butanol | 4.10 | 0.35 | 2,2-dimethyl-1,3-propanediol | 5.35 | 0.65 | 30.47 | 0.150 | 5.0 |

TABLE 3

Polymeric Material Formulations

| | Capping Group | | | Chain Extender 1 | | | Chain Extender 2 | | | DN3400, | BiND, | Calculated Uretdione Functionality, |
|---|---|---|---|---|---|---|---|---|---|---|---|---|
| Sample | Type | g | Relative equiv. | Type | g | Relative equiv. | Type | g | Relative equiv. | g | g | fUD |
| EX-2A | 2-Butanol | 0.64 | 0.74 | 2,2-dimethyl-1,3-propanediol | 0.075 | 0.14 | 1,3-BD | 0.065 | 0.12 | 2.22 | 0.006 | 1.367 |
| EX-2B | 2-Butanol | 0.64 | 0.73 | 2,2-dimethyl-1,3-propanediol | 0.112 | 0.21 | 1,3-BD | 0.032 | 0.06 | 2.21 | 0.006 | 1.367 |
| EX-2C | 2-Butanol | 0.64 | 0.74 | 2,2-dimethyl-1,3-propanediol | 0.037 | 0.07 | 1,3-BD | 0.097 | 0.19 | 2.22 | 0.006 | 1.367 |
| EX-2D | 2-Butanol | 12.3 | 0.58 | 2,2-dimethyl-1,3-propanediol | 5.01 | 0.34 | T650 | 8.00 | 0.09 | 55.4 | 0.150 | 1.99 |
| EX-2E | 2-Butanol | 12.3 | 0.58 | 2,2-dimethyl-1,3-propanediol | 3.60 | 0.24 | T650 | 16.83 | 0.18 | 55.4 | 0.150 | 1.99 |
| EX-2F | 2-Butanol | 12.3 | 0.58 | 2,2-dimethyl-1,3-propanediol | 5.50 | 0.33 | T1000 | 7.50 | 0.09 | 55.4 | 0.150 | 1.99 |
| EX-2G | 2-Butanol | 12.3 | 0.58 | 2,2-dimethyl-1,3-propanediol | 4.99 | 0.37 | THF blend | 10.40 | 0.05 | 55.4 | 0.150 | 1.99 |

TABLE 4

Polymeric Material Formulations

| | Capping Group 1 | | | Capping Group 2 | | | Chain Extender | | | DN3400, | BiND, | Calculated Uretdione Functionality, |
|---|---|---|---|---|---|---|---|---|---|---|---|---|
| Sample | Type | g | Relative equiv. | Type | g | Relative equiv. | Type | g | Relative equiv. | g | g | fUD |
| EX-3A | 2-Butanol | 10.64 | 0.375 | 2-Ethyl Hexanol | 18.67 | 0.375 | 2,2-dimethyl-1,3-propanediol | 4.98 | 0.25 | 73.9 | 0.2 | 1.37 |
| EX-3B | 2-Butanol | 5.32 | 0.19 | 2-Ethyl Hexanol | 28.03 | 0.56 | 2,2-dimethyl-1,3-propanediol | 4.98 | 0.25 | 73.9 | 0.2 | 1.37 |
| EX-3C | 2-Butanol | 15.96 | 0.56 | 2-Ethyl Hexanol | 9.34 | 0.19 | 2,2-dimethyl-1,3-propanediol | 4.98 | 0.25 | 73.9 | 0.2 | 1.37 |

TABLE 5

Polymeric Material Formulations

| | Capping Group | | | Chain Extender | | | Epoxy | | DN3400, | BiND, | Calculated Uretdione Functionality, |
|---|---|---|---|---|---|---|---|---|---|---|---|
| Sample | Type | g | Relative equiv. | Type | g | Relative equiv. | Type | g | g | g | fUD |
| EX-4A | 2-Butanol | 4.52 | 0.63 | 2,2-dimethyl-1,3-propanediol | 1.84 | 0.37 | EGE 31 | 2.78 | 18.59 | 0.05 | 1.74 |
| EX-4B | 2-Butanol | 3.27 | 0.45 | 2,2-dimethyl-1,3-propanediol | 2.80 | 0.55 | EGE 20 | 2.78 | 18.88 | 0.05 | 3.00 |
| EX-4C | 2-Butanol | 2.83 | 0.39 | 2,2-dimethyl-1,3-propanediol | 3.14 | 0.61 | EGE 20 | 2.78 | 18.99 | 0.05 | 4.00 |

TABLE 6

Viscosities of Polymeric Material-Epoxy Mixtures

| | Polymeric Material | | Epoxy | | Viscosity at 3 days, | Viscosity at 5 weeks, |
|---|---|---|---|---|---|---|
| Sample | Type | g | Type | g | P | P |
| EX-5 | EX-1A | 10.0 | H107 | 1.11 | 3120 | 3410 |
| EX-6 | EX-1A | 10.0 | EGS110 | 1.11 | 3100 | 8100 |
| EX-7 | EX-1A | 10.0 | EGE6 | 1.11 | 1510 | 2550 |
| EX-8 | EX-1A | 10.0 | EGE21 | 1.11 | 2330 | 2700 |

TABLE 6-continued

Viscosities of Polymeric Material-Epoxy Mixtures

| Sample | Polymeric Material | | Epoxy | | Viscosity at 3 days, P | Viscosity at 5 weeks, P |
|---|---|---|---|---|---|---|
| | Type | g | Type | g | | |
| EX-9  | EX-1A | 10.0 | EGE20 | 1.11 | 3550 | 2810 |
| EX-10 | EX-1A | 10.0 | H48   | 1.11 | 5260 | 6500 |
| EX-11 | EX-1A | 10.0 | H505  | 1.11 | 5860 | >110000 |
| CE-12 | EX-1A | 10.0 | No diluent | N/A* | >110000 | >110000 |

*N/A = Not applicable.

TABLE 7

Two-part formulations with different amine curatives

| Sample | Base | | Epoxy | | Amine Curative | | Average OLS, psi (MPa) | St Dev psi (MPa) |
|---|---|---|---|---|---|---|---|---|
| | Type | g | Type | g | Type | g | | |
| EX-13 | EX-1A | 3.00 | EGE31 | 0.33 | JD230   | 0.85 | 426.4 (2.94) | 198 (1.37) |
| EX-14 | EX-1A | 2.00 | EGE31 | 0.22 | JD230   | 0.44 | 327.1 (2.26) | 118.0 (0.81) |
| EX-15 | EX-1A | 2.00 | EGE31 | 0.22 | JD230   | 0.39 | 377.0 (2.60) | 104.6 (0.72) |
| EX-16 | EX-1A | 3.00 | EGE31 | 0.33 | C5607   | 0.67 | 278.7 (1.92) | 105.2 (0.73) |
| EX-17 | EX-1A | 2.00 | EGE31 | 0.22 | C5607   | 0.35 | 253.1 (1.75) | 81.7 (0.56) |
| EX-18 | EX-1A | 3.00 | EGE31 | 0.33 | JD400   | 1.63 | 98.7 (0.68) | 8.4 (0.06) |
| EX-19 | EX-1A | 3.00 | EGE31 | 0.33 | IPDA    | 0.60 | 107 (0.74) | 103.2 (0.71) |
| EX-20 | EX-1A | 3.00 | EGE31 | 0.33 | G328    | 1.07 | 116.5 (0.80) | 6.4 (0.04) |
| EX-21 | EX-1A | 3.00 | EGE31 | 0.33 | TTD     | 0.78 | 102.8 (0.71) | 40.9 (0.28) |
| EX-22 | EX-1A | 3.00 | EGE31 | 0.33 | A350A   | 0.71 | 58.6 (0.40) | N/A |
| EX-23 | EX-1A | 3.00 | EGE31 | 0.33 | JT3000  | 7.51 | Did not make adequate samples for testing | |
| EX-24 | EX-1A | 3.00 | EGE31 | 0.33 | JTHF100 | 3.68 | Did not make adequate samples for testing | |
| EX-25 | EX-1A | 3.00 | EGE31 | 0.33 | CL1000  | 1.11 | Did not make adequate samples for testing | |
| EX-26 | EX-1A | 3.00 | EGE31 | 0.33 | G240    | 2.76 | Did not make adequate samples for testing | |

TABLE 8

Two-part formulations with different polymeric materials

| Sample | Base | | Epoxy | | T403, g | Average OLS, psi | St Dev |
|---|---|---|---|---|---|---|---|
| | Type | g | Type | g | | | |
| EX-27 | EX-1B | 3.00 | EGE31 | 0.33 | 1.13  | 451.5 (3.11) | 348.6 (2.40) |
| EX-28 | EX-1D | 3.00 | EGE31 | 0.33 | 0.84  | 100 (0.69)   | 5.7 (0.04) |
| EX-29 | EX-1E | 3.00 | EGE31 | 0.33 | 0.92  | 149.5 (1.03) | 20.5 (0.14) |
| EX-30 | EX-1F | 3.00 | EGE31 | 0.33 | 0.89  | 158.5 (1.09) | 40.3 (0.28) |
| EX-31 | EX-1G | 3.00 | EGE31 | 0.33 | 0.91  | 175 (1.21)   | 45.3 (0.31) |
| EX-32 | EX-2A | 3.00 | EGE31 | 0.33 | 1.13  | 37 (0.26)    | |
| EX-33 | EX-2B | 3.00 | EGE31 | 0.33 | 1.13  | 370 (2.55)   | 216.4 (1.49) |
| EX-34 | EX-2C | 3.00 | EGE31 | 0.33 | 1.13  | 494.5 (3.41) | 340.1 (2.34) |
| EX-35 | EX-3A | 3.00 | EGE31 | 0.33 | 1.07  | 209 (1.44)   | 110.3 (0.76) |
| EX-36 | EX-3B | 3.00 | EGE31 | 0.33 | 1.05  | 125.5 (0.87) | 12.0 (0.08) |
| EX-37 | EX-3C | 3.00 | EGE31 | 0.33 | 1.10  | 22 (0.15)    | |
| EX-38 | EX-1J | 3.00 | EGE31 | 0.33 | 0.85  | 141 (0.97)   | 33.9 (0.23) |
| EX-39 | EX-1A | 1.50 | EGE31 | 0.17 | 0.57  | 147.0 (1.01) | 70.0 (0.48) |
| EX-40 | EX-4A | 3.00 | | | 0.918 | 175.0 (1.21) | 20.6 (0.14) |
| EX-41 | EX-4B | 3.00 | | | 0.994 | 343.1 (2.37) | 11.2 (0.07) |
| EX-42 | EX-4C | 3.00 | | | 0.997 | 548.3 (3.78) | |

TABLE 8-continued

Two-part formulations with different polymeric materials

| Sample | Base Type | g | Epoxy Type | g | T403, g | Average OLS, psi | St Dev |
|---|---|---|---|---|---|---|---|
| EX-43 | EX-4A | 2.00 | EGA240 | 0.10 | 0.760 | 255.9 (1.76) | 19.3 (0.13) |
| EX-44 | EX-4B | 2.00 | EGA240 | 0.10 | 0.810 | 196.3 (1.35) | 71.9 (0.50) |
| CE-45 | EX-1C | 3.00 | EGE31 | 0.33 | 0.98 | Did not form an adequate bond for testing | |

TABLE 9

Two-part formulations with different epoxy components

| Sample | Base Type | g | Epoxy Type | g | T403, g | Uretdione Equiv./ Amine Equiv. | (Uretdione + Epoxy Equiv.)/ Amine Hydrogen Equiv. | Average OLS, psi | St Dev |
|---|---|---|---|---|---|---|---|---|---|
| EX-46 | EX-1A | 3.00 | H107 | 0.33 | 1.13 | 0.63 | 0.46 | 336.3 (2.32) | 46.3 (0.32) |
| EX-47 | EX-1A | 3.00 | EGS110 | 0.33 | 1.01 | 0.70 | 0.46 | 161.3 (1.11) | 24.2 (0.17) |
| EX-48 | EX-1A | 3.00 | EGE6 | 0.33 | 1.04 | 0.68 | 0.46 | 135 (0.93) | 16.0 (0.11) |
| EX-49 | EX-1A | 3.00 | EGE21 | 0.33 | 1.24 | 0.57 | 0.46 | 336 (2.32) | 35.4 (0.24) |
| EX-50 | EX-1A | 2.07 | EGE21 | 0.23 | 0.59 | 0.83 | 0.67 | 318.7 (2.20) | 58.6 (0.40) |
| EX-51 | EX-1A | 3.00 | EGE20 | 0.33 | 1.20 | 0.59 | 0.46 | 447.5 (3.09) | 277.9 (1.92) |
| EX-52 | EX-1A | 2.07 | EGE20 | 0.23 | 0.65 | 0.75 | 0.59 | 686.1 (4.73) | 220.2 (1.52) |
| EX-53 | EX-1A | 3.00 | H48 | 0.33 | 1.16 | 0.61 | 0.46 | 788 (5.43) | 147.1 (1.01) |
| EX-54 | EX-1A | 1.50 | H48 | 0.17 | 0.40 | 0.88 | 0.68 | 662.7 (4.57) | 343.8 (2.37) |
| EX-55 | EX-1A | 3.00 | H505 | 0.33 | 0.87 | 0.81 | 0.46 | 455.5 (3.14) | 95.5 (0.66) |
| EX-56 | EX-1A | 1.62 | H505 | 0.18 | 0.37 | 1.03 | 0.58 | 256 (1.77) | 9.1 (0.06) |
| EX-57 | EX-1A | 3.00 | EGE35H | 0.33 | 0.881 | 0.80 | 0.45 | 204.5 (1.41) | 109.6 (0.76) |
| EX-58 | EX-1A | 3.00 | EGA240 | 0.33 | 1.341 | 0.53 | 0.46 | 309.5 (2.13) | 16.3 (0.11) |
| EX-59 | EX-2D | 2.65 | Epoxy-Mix | 0.35 | 0.71 | 0.88 | 0.54 | 447.1 (3.08) | 276.4 (1.91) |

TABLE 10

Non-reactive Diluent Comparison

| Sample | Base Type | g | Diluent Type | g | T403, g | Average OLS, psi | St Dev |
|---|---|---|---|---|---|---|---|
| CE-60 | EX-1A | 3.00 | — | — | 0.76 | 541.3 (3.73) | 102.3 (0.71) |
| EX-61 | EX-1A | 2.00 | EGE31 | 0.11 | 0.63 | 495 (3.41) | 194 (1.34) |
| EX-62 | EX-1A | 1.50 | EGE31 | 0.17 | 0.57 | 147.0 (1.01) | 70.0 (0.48) |
| EX-63 | EX-1A | 3.00 | H107 | 0.33 | 1.13 | 594 (4.10) | 209.4 (1.44) |
| CE-64 | EX-1A | 3.00 | H107 | 1.29 | 2.19 | 359.3 (2.48) | 200.1 (1.38) |
| CE-65 | EX-1A | 3.00 | ELV5 | 0.16 | 0.76 | 750.4 (5.17) | 174.1 (1.20) |
| CE-66 | EX-1A | 3.00 | ELV5 | 0.33 | 0.76 | 493 (3.40) | 29.9 (0.21) |
| CE-67 | EX-1A | 3.00 | ELV5 | 0.53 | 0.76 | 363.2 (2.50) | 140.9 (0.97) |
| CE-68 | EX-1A | 3.00 | ELV5 | 0.75 | 0.76 | 185.8 (1.28) | 26.2 (0.18) |
| CE-69 | EX-1A | 3.00 | ELV5 | 3.0 | 0.763= | 31.3 (0.22) | 4.9 (0.03) |
| CE-70 | EX-1A | 3.00 | JMB10 | 0.16 | 0.76 | 190.4 (1.31) | 86.4 (0.60) |
| CE-71 | EX-1A | 3.00 | JMB10 | 0.33 | 0.76 | 239 (1.65) | 1.6 (0.01) |
| CE-72 | EX-1A | 3.00 | JMB10 | 1.29 | 0.76 | 44.8 (0.31) | 1 (0.01) |
| CE-73 | EX-1A | 3.00 | JMB10 | 3.00 | 0.76 | 48.4 (0.33) | 4 (0.03) |
| CE-74 | EX-1A | 3.00 | B9-88 | 0.16 | 0.76 | 259.1 (1.79) | 7.44 (0.05) |
| CE-75 | EX-1A | 3.00 | B9-88 | 0.33 | 0.76 | 391 (2.70) | 131 (0.90) |
| CE-76 | EX-1A | 3.00 | B9-88 | 1.29 | 0.76 | 168.6 (1.16) | 8.8 (0.06) |
| CE-77 | EX-1A | 3.00 | B9-88 | 3.00 | 0.76 | 50.9 (0.35) | 16.9 (0.12) |

TABLE 11

Catalyst Evaluation

| Sample | Base Type | g | Epoxy Type | g | JT403, g | Calcium Triflate, g | AK 54, g | Average OLS, psi | Std Dev |
|---|---|---|---|---|---|---|---|---|---|
| EX-78 | EX-2E | 3.00 | EGE31 | 0.33 | 1.014 | 0.044 | 0.22 | 122.5 (0.84) | 2 (0.01) |
| EX-79 | EX-2D | 3.00 | EGE31 | 0.33 | 1.072 | 0.044 | 0.22 | 179.8 (1.24) | 25 (0.17) |
| EX-80 | EX-2F | 3.00 | EGE31 | 0.33 | 1.107 | 0.044 | 0.22 | 370 (2.55) | 116 (0.80) |
| EX-81 | EX-2G | 3.00 | EGE31 | 0.33 | 1.075 | 0.044 | 0.22 | 341.5 (2.35) | 161 (1.11) |
| EX-82 | EX-2E | 3.00 | EGE31 | 0.33 | 1.014 | | 0.22 | 162.5 (1.12) | 22 (0.15) |
| EX-83 | EX-2D | 3.00 | EGE31 | 0.33 | 1.072 | | 0.22 | 336.5 (2.32) | 12 (0.08) |
| EX-84 | EX-2F | 3.00 | EGE31 | 0.33 | 1.107 | | 0.22 | 304.75 (2.10) | 155 (1.07) |
| EX-85 | EX-2G | 3.00 | EGE31 | 0.33 | 1.075 | | 0.22 | 240 (1.65) | 140 (0.97) |
| EX-86 | EX-2D | 3.00 | EGE31 | 0.33 | 1.072 | 0.044 | | 213 (1.47) | 44 (0.30) |
| EX-87 | EX-2E | 3.00 | EGE31 | 0.33 | 1.014 | 0.044 | | 165 (1.14) | 288 (1.99) |
| EX-88 | EX-2F | 3.00 | EGE31 | 0.33 | 1.107 | 0.044 | | 434.5 (3.00) | 54 (0.37) |
| EX-89 | EX-2G | 3.00 | EGE31 | 0.33 | 1.075 | 0.044 | | 458 (3.16) | 151 (1.04) |
| EX-90 | EX-1A | 3.00 | EGE31 | 0.33 | 1.13 | 0.033 | | 472 (3.25) | — |
| EX-91 | EX-1A | 3.00 | EGE31 | 0.33 | 1.13 | 0.033 *(Calcium Nitrate was used in place of Calcium Triflate) | | 353 (2.43) | — |
| EX-92 | EX-1A | 3.00 | EGE31 | 0.33 | 1.13 | | 0.052 *(DBU was used in place of AK54) | 407.6 (2.81) | 109.5 (0.75) |

TABLE 12

Solvent Formulation

| Sample | Base Type | g | Epoxy Type | g | Amine Curative Type | g | nBuOAc, g | wt % solvent | Average OLS, psi |
|---|---|---|---|---|---|---|---|---|---|
| CE-93 | EX-1A | 3.00 | EGE-31 | 0.33 | JT403 | 1.13 | 2.23 | 33% | Did not form a homogenous mixture or form an adequate bond for testing |

TABLE 13

Higher F(UD) polymeric materials with epoxy or without epoxy

| Sample | Base Type | g | Epoxy Type | g | Amine Curative Type | g | Average OLS, psi | Std Dev |
|---|---|---|---|---|---|---|---|---|
| EX-94 | EX-1H | 3.0 | EGE31 | 0.33 | JT403 | 1.15 | 1347.9 (9.29) | 107.7 (0.74) |
| EX-95 | EX-1H | 3.0 | EGE31 | 1.29 | JT403 | 2.20 | 280.9 (1.94) | 90.7 (0.63) |
| EX-96 | EX-1H | 3.0 | B9-88 | 0.33 | JT403 | 0.78 | 214 (1.48) | 80 (0.55) |
| EX-97 | EX-1H | 3.0 | — | — | JT403 | 0.78 | 211.9 (1.46) | n/a |
| EX-98 | EX-1K | 3.0 | — | — | JT403 | 0.78 | 210.3 (1.45) | n/a |
| EX-99 | EX-1K | 3.0 | EGE31 | 0.33 | JT403 | 1.15 | 643.8 (4.44) | 19.8 (0.14) |
| EX-100 | EX-1K | 3.0 | B9-88 | 0.33 | JT403 | 0.78 | 294.3 (2.03) | 47.3 (0.33) |
| EX-101 | EX-1K | 3.0 | EGE31 | 1.29 | JT403 | 2.21 | 342.9 (2.36) | 53.3 (0.37) |
| EX-102 | EX-1L | 3.0 | EGE31 | 0.33 | Epoxy and Base were not miscible. | | | |
| CE-103 | EX-1L | 3.0 | — | — | JT403 | 0.78 | Amine Curative and Base were not miscible | |

TABLE 14

Index variation and impact on overlap shear strength.

| Sample | Base Type | g | Epoxy Type | g | JT403, g | Uretdione Equiv./ Amine Equiv. | (Uretdione + Epoxy Equiv.)/ Amine Hydrogen Equiv. | Average OLS, psi | Std Dev |
|---|---|---|---|---|---|---|---|---|---|
| EX-104 | EX-1A | 3.00 | EGE31 | 0.33 | 1.13 | 0.63 | 0.46 | 862.50 (5.95) | 237.90 (1.64) |
| EX-105 | EX-1A | 3.00 | EGE31 | 0.33 | 0.51 | 1.39 | 1.02 | 140.50 (0.97) | 33.20 (0.23) |
| EX-106 | EX-1A | 3.00 | EGE31 | 0.33 | 1.20 | 0.59 | 0.43 | 258.50 (1.78) | 132.40 (0.91) |
| EX-107 | EX-1A | 3.00 | EGE31 | 0.33 | 1.07 | 0.66 | 0.49 | 840.60 (5.80) | 192.80 (1.33) |
| EX-108 | EX-1A | 3.00 | EGE31 | 0.33 | 0.68 | 1.04 | 0.77 | 580.50 (4.00) | 132.30 (0.91) |
| EX-109 | EX-1A | 3.00 | EGE31 | 0.33 | 0.76 | 0.93 | 0.68 | 960.00 (6.62) | 87.00 (0.60) |
| EX-110* | EX-1A | 3.00 | EGE31 | 0.33 | 1.13 | 0.63 | 0.46 | 937.91 (6.47) | 293.76 (2.03) |
| EX-111* | EX-1A | 3.00 | EGE31 | 0.33 | 1.02 | 0.69 | 0.51 | 1430.84 (9.87) | 366.66 (2.53) |
| EX-112* | EX-1A | 3.00 | EGE31 | 0.33 | 0.89 | 0.79 | 0.58 | 1976.30 (13.63) | 390.85 (2.69) |
| EX-113* | EX-1A | 3.00 | EGE31 | 0.33 | 0.73 | 0.97 | 0.71 | 1309.91 (9.03) | 30.45 (0.21) |
| EX-114* | EX-1A | 3.00 | EGE31 | 0.33 | 0.62 | 1.14 | 0.84 | 842.35 (5.81) | 15.48 (0.11) |
| EX-115* | EX-1A | 3.00 | EGE31 | 0.33 | 1.36 | 0.52 | 0.38 | 234.23 (1.61) | 34.26 (0.24) |
| EX-116 | EX-1I | 3.00 | EGE31 | 0.33 | 1.14 | 0.62 | 0.46 | 1005.5 (6.93) | 228.4 (1.57) |
| EX-117 | EX-1I | 3.00 | EGE31 | 0.33 | 0.79 | 0.89 | 0.66 | 1200 (8.27) | 94.9 (0.65) |
| EX-118 | EX-1I | 3.00 | EGE31 | 0.33 | 0.89 | 0.79 | 0.58 | 1134.5 (7.82) | 66.8 (0.46) |
| EX-119 | EX-1I | 3.00 | EGE31 | 0.33 | 1.03 | 0.69 | 0.51 | 1085.1 (7.48) | 332 (2.29) |
| EX-120 | EX-1B | 3.00 | EGE31 | 0.33 | 1.01 | 0.70 | 0.52 | 583.7 (4.02) | 362 (2.50) |
| EX-121 | EX-1B | 3.00 | EGE31 | 0.33 | 0.78 | 0.91 | 0.67 | 633.7 (4.37) | 171 (1.18) |

*Samples were pulled at 0.5 inches/minute (1.27 centimeters/minute)

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymeric material comprising:
   a polymerized reaction product of a polymerizable composition comprising components, the components comprising:
   (a) a uretdione-containing material comprising a reaction product of a diisocyanate reacted with itself;
   (b) a first hydroxyl-containing compound having more than one OH group;
   (c) an optional second hydroxyl-containing compound having a single OH group, wherein the second hydroxyl-containing compound is a primary alcohol or a secondary alcohol; and
   (d) an epoxy component;
   wherein the polymeric material comprises a solids content of 90% or greater and exhibits a dynamic viscosity of 10 Poise (P) to 10,000 P, inclusive, as determined using a Brookfield viscometer.

2. The polymeric material of claim 1, wherein components (a), (b), and, if present, (c), are reacted, and then component (d) is combined with the reaction product of components (a), (b), and, if present, (c).

3. The polymeric material of claim 1, wherein component (d) is present at the time of reaction of components (a), (b), and, if present, (c).

4. The polymeric material of claim 1, wherein the second hydroxyl-containing compound is present and is an alkyl alcohol, a polyester alcohol, or a polyether alcohol.

5. The polymeric material of claim 1, wherein the first hydroxyl-containing compound is an alkylene polyol, a polyester polyol, or a polyether polyol.

6. The polymeric material of claim 1, wherein the uretdione-containing material comprises a compound of Formula I:

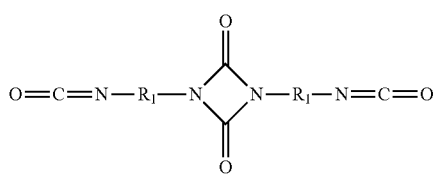

wherein $R_1$ is independently a $C_4$ to $C_{14}$ alkylene, arylene, and alkaralyene.

7. The polymeric material of claim 1, comprising an average of 1.3 to 6.0, inclusive, of a uretdione functional group in a backbone of the polymeric material.

8. The polymeric material of claim 1, wherein the polymeric material is essentially free of isocyanates.

9. The polymeric material of claim 1, wherein the epoxy component exhibits a Log water octanol partition coefficient according to the Moriguchi method of less than 27.5, less than 18, less than 10, less than 5, or less than 2.3.

10. The polymeric material of claim 1, wherein the epoxy component comprises at least one multifunctional epoxy.

11. The polymeric material of claim 1, wherein the epoxy component comprises at least one glycidyl ether group.

12. The polymeric material of claim 1, wherein the epoxy component comprises an aliphatic epoxy.

13. The polymeric material of claim 1, wherein the epoxy component is present in an amount of 31% by weight or less, based on the total weight of the polymerizable composition.

14. A two-part composition comprising:
(a) a first part comprising a polymeric material comprising:
a polymerized reaction product of a polymerizable composition comprising components, the components comprising:
(i) a uretdione-containing material comprising a reaction product of a diisocyanate reacted with itself;
(ii) a first hydroxyl-containing compound having more than one OH group;
(iii) an optional second hydroxyl-containing compound having a single OH group, wherein the second hydroxyl-containing compound is a primary alcohol or a secondary alcohol; and
(iv) (iv) an epoxy component;
wherein the polymeric material comprises an average of 1.3 or greater of a uretdione functional group in a backbone of the polymeric material and wherein the polymeric material comprises a solids content of 90% or greater and exhibits a dynamic viscosity of 10 Poise (P) to 10,000 P, inclusive, as determined using a Brookfield viscometer; and
(b) a second part comprising at least one amine, at least one molecule of the at least one amine having an average amine functionality of 2.0 or greater, wherein each amine is a primary amine or a secondary amine.

15. The two-part composition of claim 14, wherein at least one molecule of the at least one amine has an average amine functionality of 3.0 or greater.

16. A polymerized product of the two-part composition of claim 14.

17. The polymerized product of claim 16, wherein the polymerized product coats at least a portion of a substrate.

18. A method of adhering two substrates together, the method comprising:
(a) obtaining a two-part composition, the two-part composition comprising:
(i) a first part comprising:
a polymeric material comprising a reaction product of a polymerizable composition comprising components, the components comprising:
(1) a uretdione-containing material comprising a reaction product of a diisocyanate reacted with itself;
(2) a first hydroxyl-containing compound having more than one OH group;
(3) an optional second hydroxyl-containing compound having a single OH group, wherein the second hydroxyl-containing compound is a primary alcohol or a secondary alcohol; and
(4) an epoxy component;
wherein the polymeric material comprises an average of 1.3 or greater of a uretdione functional group in a backbone of the polymeric material and wherein the polymeric material comprises a solids content of 90% or greater and exhibits a dynamic viscosity of 10 Poise (P) to 10,000 P, inclusive, as determined using a Brookfield viscometer; and
(ii) a second part comprising at least one amine, at least one molecule of the at least one amine having an average amine functionality of 2.0 or greater wherein each amine is a primary amine or a secondary amine;
(b) combining at least a portion of the first part with at least a portion of the second part to form a mixture;
(c) disposing at least a portion of the mixture on a first major surface of a first substrate; and
(d) contacting a first major surface of a second substrate with the mixture disposed on the first substrate.

19. The method of claim 18, wherein the adhesive exhibits a minimum overlap shear on aluminum of 0.3 megaPascals (MPa).

20. A method of making a two-part composition, the method comprising:
(a) providing a first part by forming a polymeric material of claim 1; and
(b) providing a second part comprising at least one amine, at least one molecule of the at least one amine having an average amine functionality of 2.0 or greater, wherein each amine is a primary amine or a secondary amine.

* * * * *

UNITED STATES PATENT AND TRADEMARK OFFICE
CERTIFICATE OF CORRECTION

PATENT NO. : 11,655,327 B2
APPLICATION NO. : 17/265023
DATED : May 23, 2023
INVENTOR(S) : Kolby White et al.

Page 1 of 1

It is certified that error appears in the above-identified patent and that said Letters Patent is hereby corrected as shown below:

In the Claims

<u>Column 63</u>
Line 15, In Claim 14, delete "(iv) (iv)" and insert -- (iv) --, therefor.

Signed and Sealed this
Thirty-first Day of October, 2023

Katherine Kelly Vidal
*Director of the United States Patent and Trademark Office*